United States Patent
Ujiie et al.

(10) Patent No.: US 11,553,484 B2
(45) Date of Patent: Jan. 10, 2023

(54) COMMUNICATION DEVICE, COMMUNICATION METHOD, AND COMMUNICATION SYSTEM

(71) Applicant: Panasonic Intellectual Property Corporation of America, Torrance, CA (US)

(72) Inventors: Yoshihiro Ujiie, Osaka (JP); Yuishi Torisaki, Osaka (JP); Tomoyuki Haga, Nara (JP); Hiroyasu Terazawa, Osaka (JP); Ryo Kato, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 129 days.

(21) Appl. No.: 17/129,012

(22) Filed: Dec. 21, 2020

(65) Prior Publication Data

US 2021/0153194 A1    May 20, 2021

Related U.S. Application Data

(63) Continuation of application No. 16/380,447, filed on Apr. 10, 2019, now Pat. No. 10,904,883, which is a
(Continued)

(30) Foreign Application Priority Data

Jul. 26, 2017 (WO) .................. PCT/JP2017/027116

(51) Int. Cl.
*H04W 72/04* (2009.01)
*H04W 8/02* (2009.01)
(Continued)

(52) U.S. Cl.
CPC ......... *H04W 72/0446* (2013.01); *H04L 12/28* (2013.01); *H04L 12/40* (2013.01); *H04L 12/66* (2013.01); *H04W 8/02* (2013.01)

(58) Field of Classification Search
CPC .. G06F 21/604; G06F 21/606; G06F 21/6218; G06F 21/85; H04L 12/40143;
(Continued)

(56) References Cited

U.S. PATENT DOCUMENTS

| 6,536,816 B1 | 3/2003 | Fan |
| 7,295,552 B1 | 11/2007 | Kadambi |

(Continued)

FOREIGN PATENT DOCUMENTS

| CN | 101674312 | 3/2010 |
| JP | 10-271154 | 10/1998 |

(Continued)

OTHER PUBLICATIONS

Ghafir et al., Blacklist-based Malicious IP Traffic Detection, IEEE, 5 pages, 2015.*

(Continued)

*Primary Examiner* — Frank Duong
(74) *Attorney, Agent, or Firm* — Wenderoth, Lind & Ponack, L.L.P.

(57) ABSTRACT

A communication device is a communication device connected to a mobility network which is a network mounted in a mobility and which is used by a plurality of electronic control devices for communication. The communication device includes: a holding unit which holds range information indicating a transferable path range determined for a message on the mobility network; a receiving unit which receives the message on the mobility network; and a determining unit which determines validity of the received message by using the range information.

16 Claims, 32 Drawing Sheets

Related U.S. Application Data continuation of application No. PCT/JP2018/027465, filed on Jul. 23, 2018.

(51) Int. Cl.
*H04L 12/28* (2006.01)
*H04L 12/40* (2006.01)
*H04L 12/66* (2006.01)

(58) Field of Classification Search
CPC ... H04L 12/28; H04L 12/40; H04L 12/40169; H04L 12/66; H04L 45/74; H04L 47/28; H04L 63/0263; H04L 63/0281; H04L 63/08; H04L 63/14; H04L 63/1408; H04L 63/1425; H04L 63/1441; H04L 2012/40215; H04L 63/1458; H04L 67/12; H04L 2463/121; H04W 4/48; H04W 8/02; H04W 12/08; H04W 12/121; H04W 12/61; H04W 72/0446

See application file for complete search history.

(56) References Cited

U.S. PATENT DOCUMENTS

| | | | | |
|---|---|---|---|---|
| 7,873,731 | B1 * | 1/2011 | Leavy | H04L 63/1416 |
| | | | | 709/225 |
| 10,374,901 | B2 * | 8/2019 | Ge | H04L 41/12 |
| 10,650,621 | B1 | 5/2020 | King | |
| 10,892,913 | B2 * | 1/2021 | Iwata | H04L 12/40006 |
| 2003/0117298 | A1 | 6/2003 | Tokunaga et al. | |
| 2004/0107252 | A1 | 6/2004 | Futa et al. | |
| 2004/0174824 | A1 | 9/2004 | Ohta et al. | |
| 2005/0180421 | A1 * | 8/2005 | Shimada | H04L 63/1466 |
| | | | | 370/389 |
| 2010/0165980 | A1 | 7/2010 | Sargor | |
| 2015/0020152 | A1 | 1/2015 | Litichever et al. | |
| 2017/0026907 | A1 | 1/2017 | Min | |
| 2018/0308111 | A1 | 10/2018 | Bigbee | |
| 2019/0190775 | A1 | 6/2019 | Buckley | |

FOREIGN PATENT DOCUMENTS

| | | |
|---|---|---|
| JP | 2002-16614 | 1/2002 |
| JP | 4129216 | 8/2008 |
| JP | 4181951 | 11/2008 |
| JP | 2016-134170 | 7/2016 |
| WO | 2004/051946 | 6/2004 |
| WO | 2013/144962 | 10/2013 |

OTHER PUBLICATIONS

Gont, Security Assessment of the Internet Protocol version 4, Internet-Draft, 89 pages, Apr. 8, 2011.*

Office Action and Search Report dated May 7, 2021 in corresponding Chinese Patent Application No. 201880003923.9, With English-language translation of Search Report.

International Search Report (ISR) dated Sep. 11, 2018 in International (PCT) Application No. PCT/JP2018/027465.

International Search Report (ISR) dated Oct. 17, 2017 in International (PCT) Application No. PCT/JP2017/027116.

* cited by examiner

FIG. 2

| Device | MAC address | IP address |
|---|---|---|
| ECU300a | 0a:0a:0a:0a:0a:0a | 192.168.0.1 |
| ECU300b | 0b:0b:0b:0b:0b:0b | 192.168.0.2 |
| ECU300c | 0c:0c:0c:0c:0c:0c | 192.168.0.3 |
| ECU300d | 0d:0d:0d:0d:0d:0d | 192.168.0.4 |
| ECU300e | 0e:0e:0e:0e:0e:0e | 192.168.0.5 |
| IVI200 | 14:14:14:14:14:14 | 192.168.0.6 |
| TCU500 | 32:32:32:32:32:32 | 192.168.0.7 |
| CGW400 | 04:04:04:04:04:04 | 192.168.0.127 |

FIG. 8

| MAC header | | IP header | | | IP payload | |
|---|---|---|---|---|---|---|
| Source MAC address | Destination MAC address | TTL | Source IP address | Destination IP address | Data body | Sensor data |
| 0a:0a:0a:0a:0a:0a | 0c:0c:0c:0c:0c:0c | 1 | 192.168.0.1 | 192.168.0.3 | | |

FIG. 9

| Port No. | MAC address |
|---|---|
| 1 | 0a:0a:0a:0a:0a:0a |
| 2 | 0b:0b:0b:0b:0b:0b |
| 3 | 0c:0c:0c:0c:0c:0c |
| 4 | 0d:0d:0d:0d:0d:0d |
| 5 | 0e:0e:0e:0e:0e:0e |
| 6 | 04:04:04:04:04:04 |

FIG. 10

| Source MAC address | Destination MAC address | TTL |
|---|---|---|
| 0a:0a:0a:0a:0a:0a | 0c:0c:0c:0c:0c:0c | 1 |
| 0b:0b:0b:0b:0b:0b | 0c:0c:0c:0c:0c:0c | 1 |
| 0d:0d:0d:0d:0d:0d | 0c:0c:0c:0c:0c:0c | 1 |
| 0e:0e:0e:0e:0e:0e | 04:04:04:04:04:04 | 2 |
| 0c:0c:0c:0c:0c:0c | 04:04:04:04:04:04 | 2 |

FIG. 13

| Port No. | IP address |
|---|---|
| 1 | 192.168.0.1 |
| 2 | 192.168.0.2 |
| 3 | 192.168.0.3 |
| 4 | 192.168.0.4 |
| 5 | 192.168.0.5 |
| 6 | 192.168.0.127 |

FIG. 14

| Source IP address | Destination IP address | TTL |
|---|---|---|
| 192.168.0.1 | 192.168.0.3 | 2 |
| 192.168.0.2 | 192.168.0.3 | 2 |
| 192.168.0.4 | 192.168.0.3 | 2 |
| 192.168.0.5 | 192.168.0.6 | 3 |
| 192.168.0.3 | 192.168.0.7 | 3 |

FIG. 18

| MAC header | | IP header | | | IP payload |
|---|---|---|---|---|---|
| Source MAC address | Destination MAC address | TTL | Source IP address | Destination IP address | Data body |
| 0a:0a:0a:0a:0a:0a | 0c:0c:0c:0c:0c:0c | 255 | 192.168.0.1 | 192.168.0.3 | Sensor data |

FIG. 21

| Source IP address | Destination IP address | RTT [msec] |
|---|---|---|
| 192.168.0.1 | 192.168.0.3 | 2 |
| 192.168.0.2 | 192.168.0.3 | 2 |
| 192.168.0.4 | 192.168.0.3 | 2 |
| 192.168.0.5 | 192.168.0.6 | 3 |
| 192.168.0.3 | 192.168.0.7 | 3 |

FIG. 25

| Device | MAC address | IP address |
|---|---|---|
| ECU300a | 0a:0a:0a:0a:0a:0a | 192.168.0.1 |
| IVI200 | 14:14:14:14:14:14 | 192.168.0.6 |
| TCU500 | 32:32:32:32:32:32 | 192.168.0.7 |
| CGW400 | 04:04:04:04:04:04 | 192.168.0.127 |

FIG. 27

| MAC header | | IP header | | | | IP payload |
|---|---|---|---|---|---|---|
| Source MAC address | Destination MAC address | TTL | Source IP address | Destination IP address | Data body |
| 0a:0a:0a:0a:0a:0a | FF:FF:FF:FF:FF:FF | 32 | 192.168.0.1 | 255.255.255.255 | Sensor data |

FIG. 28

| Port No. | MAC address |
|---|---|
| 1 | 0a:0a:0a:0a:0a:0a |
| 2 | 04:04:04:04:04:04 |

FIG. 29

| Source MAC address | Destination MAC address | State | TTL |
|---|---|---|---|
| 0a:0a:0a:0a:0a:0a | * | Stopped | 32 |
| 0a:0a:0a:0a:0a:0a | * | Moving | 2 |

FIG. 31

| Source IP address | Destination IP address | State | TTL |
|---|---|---|---|
| 192.168.0.1 | * | Stopped | 32 |
| 192.168.0.1 | * | Moving | 2 |

FIG. 34

| Source IP address | Destination IP address | State | RTT [msec] |
|---|---|---|---|
| 192.168.0.1 | * | Stopped | 32 |
| 192.168.0.1 | * | Moving | 2 |

COMMUNICATION DEVICE, COMMUNICATION METHOD, AND COMMUNICATION SYSTEM

CROSS REFERENCE TO RELATED APPLICATIONS

This is a continuation of U.S. application Ser. No. 16/380,447, filed Apr. 10, 2019, which is a continuation application of PCT International Application No. PCT/JP2018/027465 filed on Jul. 23, 2018, designating the United States of America, which is based on and claims priority of PCT International Application PCT/JP2017/027116 filed on Jul. 26, 2017. The entire disclosures of the above-identified applications, including the specifications, drawings and claims are incorporated herein by reference in their entirety.

FIELD

One or more exemplary embodiments disclosed herein relate generally to, for example, a communication device connected to a mobility network.

BACKGROUND

Patent Literature (PTL) 1 discloses a device which determines an apparatus positioned within the same group based on the time taken for communication. PTL 2 discloses a device which restricts the range in which content is shared, by using the value of the time to live (TTL) field of an internet protocol (IP) frame.

CITATION LIST

Patent Literature

[PTL 1] Japanese Patent No. 4129216
[PTL 2] Japanese Patent No. 4181951

SUMMARY

Technical Problem

In PTL 1 and PTL 2, a transmission source communication device performs control for preventing data leakage. Accordingly, there is a possibility that proper operations are not performed due to, for example, tempering of the transmission source communication device, leading to data leakage.

In view of the above, one non-limiting and exemplary embodiment provides, for example, a communication device which is capable of preventing data leakage.

Solution to Problem

In one general aspect, the techniques disclosed here feature a communication device connected to a mobility network which is a network mounted in a mobility. The mobility network is a network used by a plurality of electronic control devices for communication. The communication device includes: a holding unit which holds range information indicating a transferrable path range determined for a message on the mobility network; a receiving unit which receives the message on the mobility network; and a determining unit which determines a validity of the message received, by using the range information.

It should be noted that these general and specific aspects may be implemented using a system, a device, a method, an integrated circuit, a computer program, or a computer readable non-transitory recording medium such as a CD-ROM, or any combination of systems, devices, methods, integrated circuits, computer programs, or recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A communication device according to one or more exemplary embodiments or features disclosed herein is capable of preventing data leakage.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 illustrates an example of a list of IP addresses and MAC addresses according to Embodiment 1.

FIG. 8 illustrates an example of fields included in a message transmitted from the ECU according to Embodiment 1.

FIG. 9 illustrates an example of a structure of a transfer table according to Embodiment 1.

FIG. 10 illustrates an example of a structure of a TTL whitelist according to Embodiment 1.

FIG. 13 illustrates an example of a structure of a transfer table according to Variation 1 of Embodiment 1.

FIG. 14 illustrates an example of a structure of a TTL whitelist according to Variation 1 of Embodiment 1.

FIG. 18 illustrates an example of fields included in a message transmitted from an ECU according to Variation 3 of Embodiment 1.

FIG. 21 illustrates an example of a structure of a round trip time (RTT) whitelist according to Embodiment 2.

FIG. 25 illustrates an example of a list of IP addresses and MAC addresses according to Embodiment 3.

FIG. 27 illustrates an example of fields included in a message transmitted from an ECU according to Embodiment 3.

FIG. 28 illustrates an example of a structure of a transfer table according to Embodiment 3.

FIG. 29 illustrates an example of a configuration of a TTL whitelist according to Embodiment 3.

FIG. 31 illustrates an example of a structure of a TTL whitelist according to a variation of Embodiment 3.

FIG. 34 illustrates an example of a structure of an RTT whitelist according to Embodiment 4.

Figure 1:
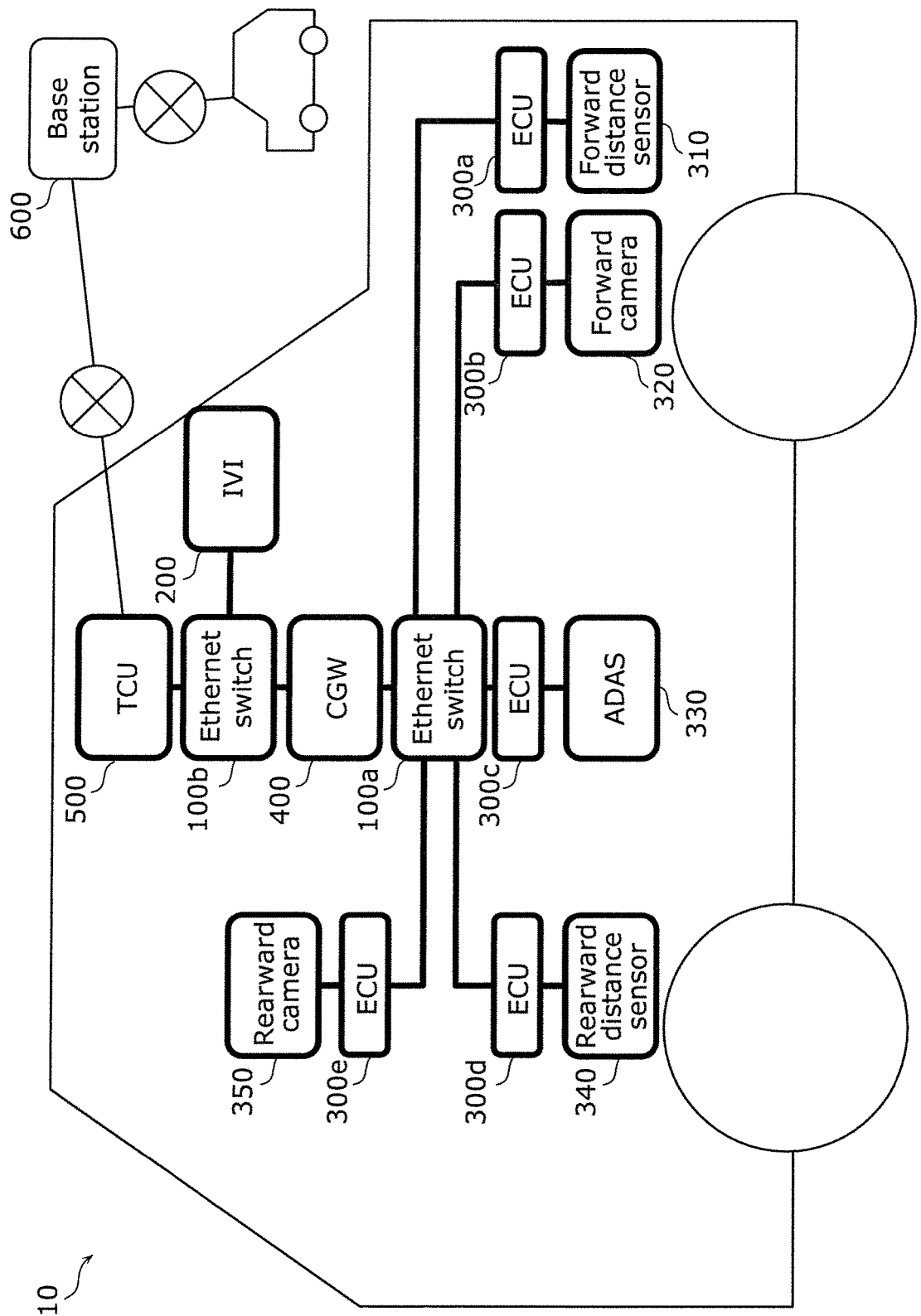
FIG. 1 illustrates an example of an overall configuration of an in-vehicle network system according to Embodiment 1.

DESCRIPTION OF EMBODIMENTS (Underlying Knowledge Forming Basis of the Present Disclosure)

In recent years, the system in a vehicle includes a plurality of devices referred to as electronic control units (hereinafter, referred to as ECUs). The network connecting these ECUs is referred to as an in-vehicle network. There are a plurality of standards for the in-vehicle network. Moreover, there is a trend, which has been attracting attention, towards applying Ethernet (registered trademark) proven as a general information network to the in-vehicle network.

Use of the Ethernet significantly increases the bandwidth and allows existing technology assets generated in the fields other than vehicles to be utilized, which are expected to lead to cost reduction and the like. In contrast, there is also a concern of an increase in possible security risk.

Moreover, automatic electronic systems are expected to keep evolving, and the amount of data to be handled may become enormous. The data expected to increase in the future is, for example, various types of sensor data and video data which will be essential for self-driving technology or the like. Simply externally monitoring the data reveals where the vehicle is currently traveling and the surrounding situation of the vehicle. Hence, it is important to take measures for preventing the data from unintentionally being leaked externally.

There is a possibility that a specific node present in a vehicle is tampered with and a message to be transmitted only within the in-vehicle network is unintentionally transmitted to outside the vehicle. Assuming such a case, sufficient studies have not been made thus far on a communication device which determines the validity of the message according to the range the message reaches, such as whether the transmission destination is inside or outside the vehicle.

PTL 1 discloses a device which determines an apparatus positioned within the same group based on the time taken for communication. PTL 2 discloses a device which restricts the range in which content is shared, by using the TTL field value of an IP frame.

In PTL 1 and PTL 2, a transmission source communication device performs control for preventing data leakage. Accordingly, there is a possibility that proper operations are not performed due to, for example, tampering of the transmission source communication device, leading to data leakage.

In view of the above, a communication device according to one aspect of the present disclosure is a communication device connected to a mobility network which is a network mounted in a mobility. The mobility network is a network used by a plurality of electronic control devices for communication. The communication device includes: a holding unit which holds range information indicating a transferrable path range determined for a message on the mobility network; a receiving unit which receives the message on the mobility network; and a determining unit which determines a validity of the message received, by using the range information.

With this, the communication device is capable of suppressing the situation where messages on the mobility network are transferred while exceeding the assumed range, and is capable of preventing data leakage.

For example, it may be that the range information indicates a range of a time to live (TTL) as the transferable path range, and the determining unit determines the validity of the message received by comparing a value of the TTL included in the message received with the range of the TTL indicated by the range information.

With this, the communication device is capable of determining the validity of the message according to whether the TTL value has been appropriately set to the message. Accordingly, the communication device is capable of suppressing the situation where messages are transferred while exceeding the assumed range, and is capable of preventing data leakage.

Moreover, for example, it may be that the range information indicates a range of a round trip time (RTT) as the transferrable path range, and the determining unit determines the validity of the message received by comparing a value of the RTT derived from information included in the message received with the range of the RTT indicated by the range information.

With this, the communication device is capable of determining the validity of the message according to whether the RTT value set to the message is in an appropriate range. Accordingly, the communication device is capable of suppressing the situation where messages are transferred while exceeding the assumed range, and is capable of preventing data leakage.

Moreover, for example, it may be that the range information indicates the transferrable path range determined according to one of a transmission source and a transmission destination.

With this, the communication device is capable of appropriately determining the validity of the message by using the range information which indicates the transferable path range determined according to the transmission source or the transmission destination.

Moreover, for example, it may be that the range information indicates the transferrable path range determined according to one of a media access control (MAC) address of the transmission source and a MAC address of the transmission destination.

With this, for example, even when the communication device is an L2 switch which transfers a message by using the MAC address, the communication device is capable of appropriately determining the validity of the message by using the range information which indicates the transferrable path range determined according to the MAC address.

Moreover, for example, it may be that the range information indicates the transferrable path range determined according to one of an Internet protocol (IP) address of the transmission source and an IP address of the transmission destination.

With this, for example, even when the communication device is an L3 switch which transfers a message by using the IP address, the communication device is capable of appropriately determining the validity of the message by using the range information which indicates the transferrable path range determined according to the IP address.

Moreover, for example, it may be that the range information indicates the transferrable path range determined according to a state of the mobility.

With this, even when the transferrable path range varies according to a change in mobility state, the communication device is capable of appropriately determining the validity of the message by using the range information which indicates the transferrable path range determined according to the mobility state.

Moreover, for example, it may be that the state of the mobility is related to one of a state where the mobility is moving and a state where the mobility is stopped.

With this, even when the transferrable path range in the state where the mobility is moving is different from the transferrable path range in the state where the mobility is stopped, the communication device is capable of appropriately determining the validity of the message by using the range information which indicates the transferrable path range determined according to each state.

Moreover, for example, it may be that the range information indicates a fixed range statically predetermined, as the transferrable path range.

With this, for example, under the static environment, the communication device is capable of appropriately determining the validity of the message by using the range information determined statically.

Moreover, for example, it may be that the communication device further includes an updating unit which dynamically updates the range information according to an update of the plurality of electronic control devices.

With this, the communication device is capable of updating the range information according to, for example, a physical change corresponding to the addition or deletion of an electronic control device, and is capable of appropriately determining the validity of the message by using the updated range information. In other words, the communication device is capable of appropriately determining the validity of the message by using the range information determined more flexibly.

Moreover, for example, it may be that the updating unit dynamically updates the range information according to an update of attribute information of the plurality of electronic control devices.

With this, for example, even under the environment where attribute information corresponding to the IP address or the like of an electronic control device is changed dynamically, the communication device is capable of appropriately determining the validity of the message by using the range information dynamically determined.

Moreover, for example, it may be that the attribute information is updated using a Scalable service-Oriented MiddlewarE over IP (SOME/IP) protocol.

With this, even under the environment where attribute information of an electronic control device is dynamically changed by update or the like of a firmware based on SOME/IP, the communication device is capable of appropriately determining the validity of the message by using the range information dynamically determined.

Moreover, for example, it may be that the communication device further includes a processing unit which executes a predetermined action, based on a determination result of the validity of the message received.

With this, the communication device is capable of executing appropriate processing based on the determination result, and is capable of increasing the safety of the overall system of the mobility network.

Moreover, for example, it may be that the processing unit controls whether or not the message received can be transferred, based on the determination result.

With this, the communication device is capable of appropriately controlling whether or not the message can be transferred, and is capable of increasing the safety of the overall system of the mobility network.

Moreover, for example, it may be that the processing unit records the determination result.

With this, the communication device allows the determination result to be analyzed later. Moreover, the communication device is capable of appropriately updating the transferrable path range indicated by the range information.

Moreover, for example, it may be that the processing unit notifies a transmission source of the message received of the determination result.

With this, the communication device is capable of directing the transmission source to transmit an appropriate message.

Moreover, for example, it may be that the communication device further includes a processing unit which, when the message received is determined not to be valid, updates the message received by updating the value of the TTL included in the message received with a value within the range of the TTL indicated by the range information, and transfers the message updated.

With this, under the environment where the transmission source is unlikely to set an appropriate TTL value to a message, the communication device is capable of setting an appropriate TTL value to the message.

Moreover, a communication method according to one aspect of the present disclosure may be a communication method performed in a mobility network which is a network mounted in a mobility. The mobility network is a network used by a plurality of electronic control devices for communication. The communication method includes: receiving a message on the mobility network; and determining a validity of the message received, by using range information indicating a transferrable path range determined for the message on the mobility network.

With this, the situation where messages on the mobility network are transferred while exceeding the assumed range can be suppressed. Accordingly, data leakage can be prevented.

Moreover, a communication system according to one aspect of the present disclosure is a communication system in a mobility network which is a network mounted in a mobility. The mobility network is a network used by a plurality of electronic control devices for communication. The communication system includes: a holding unit which holds range information indicating a transferrable path range determined for a message on the mobility network; a receiving unit which receives the message on the mobility network; and a determining unit which determines a validity of the message received, by using the range information.

With this, the communication system is capable of suppressing the situation where messages on the mobility network are transferred while exceeding the assumed range, and is capable of preventing data leakage.

Moreover, it should be noted that these general and specific aspects may be implemented using a system, a device, a method, an integrated circuit, a computer program, or a computer readable non-transitory recording medium such as a CD-ROM, or any combination of systems, devices, integrated circuits, computer programs, or recording media.

Hereinafter, a communication device, a communication method, and a communication system according to certain exemplary embodiments are described in greater detail with reference to the accompanying drawings.

Note that each embodiment described below shows a general or specific example. In other words, the numerical values, shapes, materials, structural components, the arrangement and connection of the structural components, steps, the processing order of the steps etc. shown in the following embodiments are mere examples, and therefore do not limit the scope of the claims. Among the structural components in the following embodiments, structural components not recited in any one of the independent claims defining the most generic part are described as arbitrary structural components.

Embodiment 1

In the present embodiment, the time to live (TTL) included in a received message is checked against a predetermined whitelist. Hereinafter, a communication device, which has a function of checking the TTL included in a received message against a predetermined whitelist, will be described with reference to the drawings.

[1.1 Overall Configuration of In-Vehicle Network System]

FIG. 1 illustrates an example of an overall configuration of an in-vehicle network system according to the present embodiment. An in-vehicle network system 10 includes Ethernet switches 100a and 100b, an in-vehicle information system (hereinafter, referred to as IVI) 200, ECUs 300a, 300b, 300c, 300d, and 300e, a central gateway (hereinafter, referred to as CGW) 400, and a telematics control unit (hereinafter, referred to as TCU) 500.

The Ethernet switches 100a and 100b each are a switching hub and are interconnected via the CGW 400 and an Ethernet cable. The Ethernet switch 100a is connected to the ECU 300a to ECU 300e via Ethernet cables. Moreover, the Ethernet switch 100b is connected to the IVI 200 and the TCU 500 via Ethernet cables. Ethernet switches 100a and 100b each has a function of transferring the messages received via the respective ports to another port or all ports.

The IVI 200 is connected to the Ethernet switch 100b via an Ethernet cable. The IVI 200 has a display. The IVI 200 has a function of presenting information to a driver.

The ECU 300a to ECU 300e are respectively connected to a forward distance sensor 310, a forward camera 320, an advanced driver-assistance system (hereinafter, ADAS) 330, a rearward distance sensor 340, and a rearward camera 350. Moreover, each of the ECU 300a to ECU 300e has a function of obtaining information from the connected device and transmitting, to another ECU, the obtained information as a message.

The CGW 400 is connected to the Ethernet switches 100a and 100b via Ethernet. The CGW 400 has a function of a router which divides respective domains.

The TCU 500 is connected to the Ethernet switch 100a via an Ethernet cable. Moreover, the TCU 500 has a function of communicating with a base station 600 via wireless communication such as 3G or LTE (registered trademark), and externally obtaining information necessary within the vehicle or externally transmitting the information within the vehicle. The description of the base station 600 is omitted.

[1.2 List of IP Addresses and MAC Addresses]

FIG. 2 illustrates an example of a list of IP addresses and MAC addresses according to the present embodiment. For example, a MAC address is uniquely set by a component mounted at the time of manufacturing, and an IP address is statically given at the time of system configuration.

[1.3 Configuration of Ethernet Switch]

Figure 3:
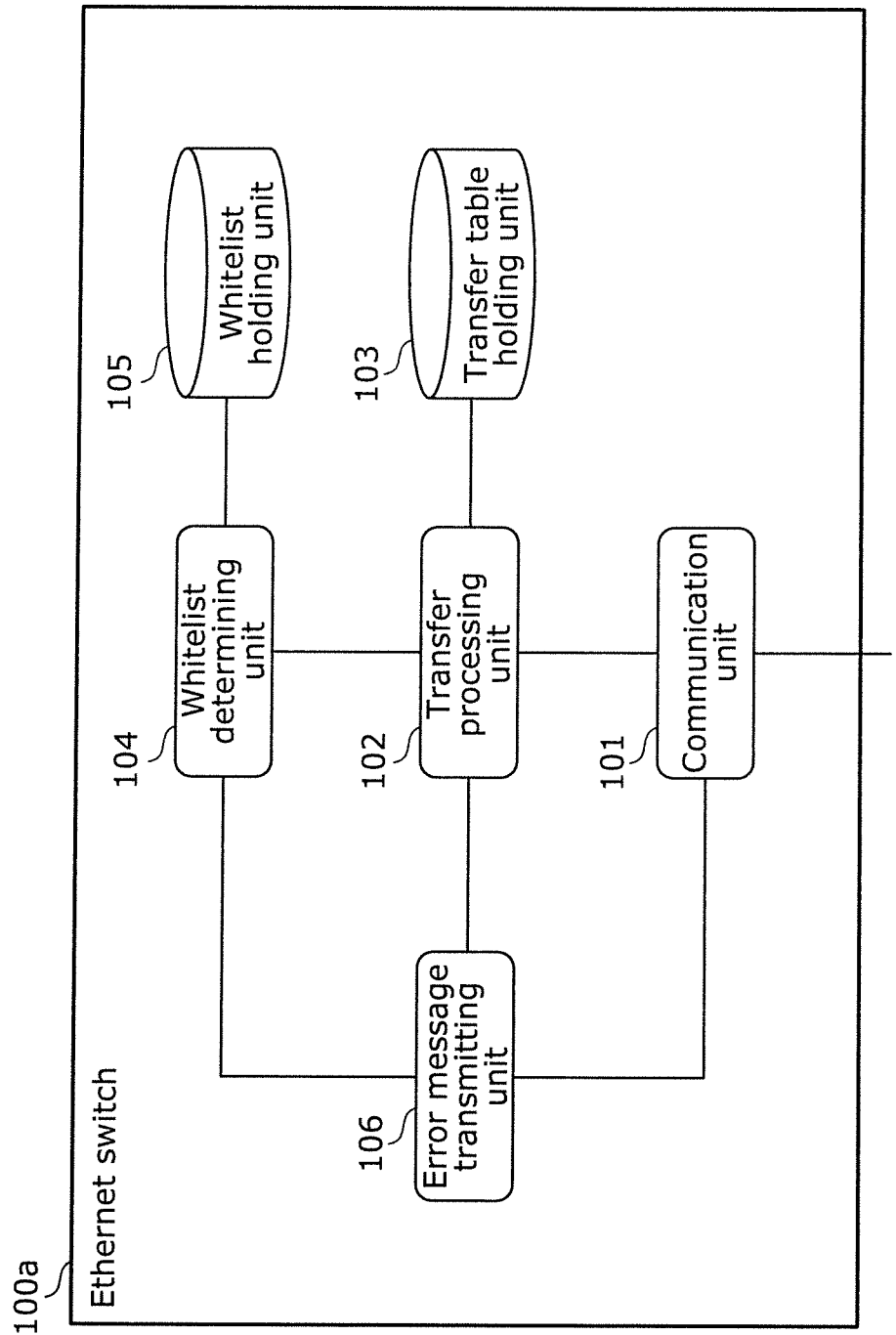
FIG. 3 illustrates an example of a configuration of an Ethernet switch according to Embodiment 1.

FIG. 3 illustrates an example of a configuration of the Ethernet switch 100a according to the present embodiment. The Ethernet switch 100a includes: a communication unit 101; a transfer processing unit 102; a transfer table holding unit 103; a whitelist determining unit 104; a whitelist holding unit 105; and an error message transmitting unit 106.

Note that the Ethernet switch 100b is the same as the Ethernet switch 100a in configuration, and thus, the description thereof is omitted.

The communication unit 101 receives a message from another ECU and notifies the transfer processing unit 102 of the received message, via the Ethernet. Moreover, the communication unit 101 transmits a message to the destination ECU notified by the transfer processing unit 102 or the error message transmitting unit 106.

The transfer processing unit 102 determines whether or not the message can be transferred, based on the transfer table obtained from the transfer table holding unit 103 and the determination result of the whitelist determining unit 104. When the message can be transferred, the transfer processing unit 102 notifies the communication unit 101 of the transfer destination. When the message cannot be transferred, the transfer processing unit 102 may notify the error message transmitting unit 106 that the message cannot be transferred.

The transfer table holding unit 103 holds a transfer table. The details of the transfer table will be described with reference to FIG. 9.

The whitelist determining unit 104 makes determination on the message, according to the whitelist held in the whitelist holding unit 105 and the received message notified by the transfer processing unit 102. The whitelist determining unit 104 then notifies the transfer processing unit 102 and the error message transmitting unit 106 of the determination result.

The whitelist holding unit 105 holds a whitelist for determining whether or not the message can be transferred. The details of the whitelist will be described with reference to FIG. 10.

The error message transmitting unit 106 notifies the communication unit 101 to transmit an error message based on the result notified by the transfer processing unit 102 or the whitelist determining unit 104.

[1.4 Configuration of IVI]

Figure 4:
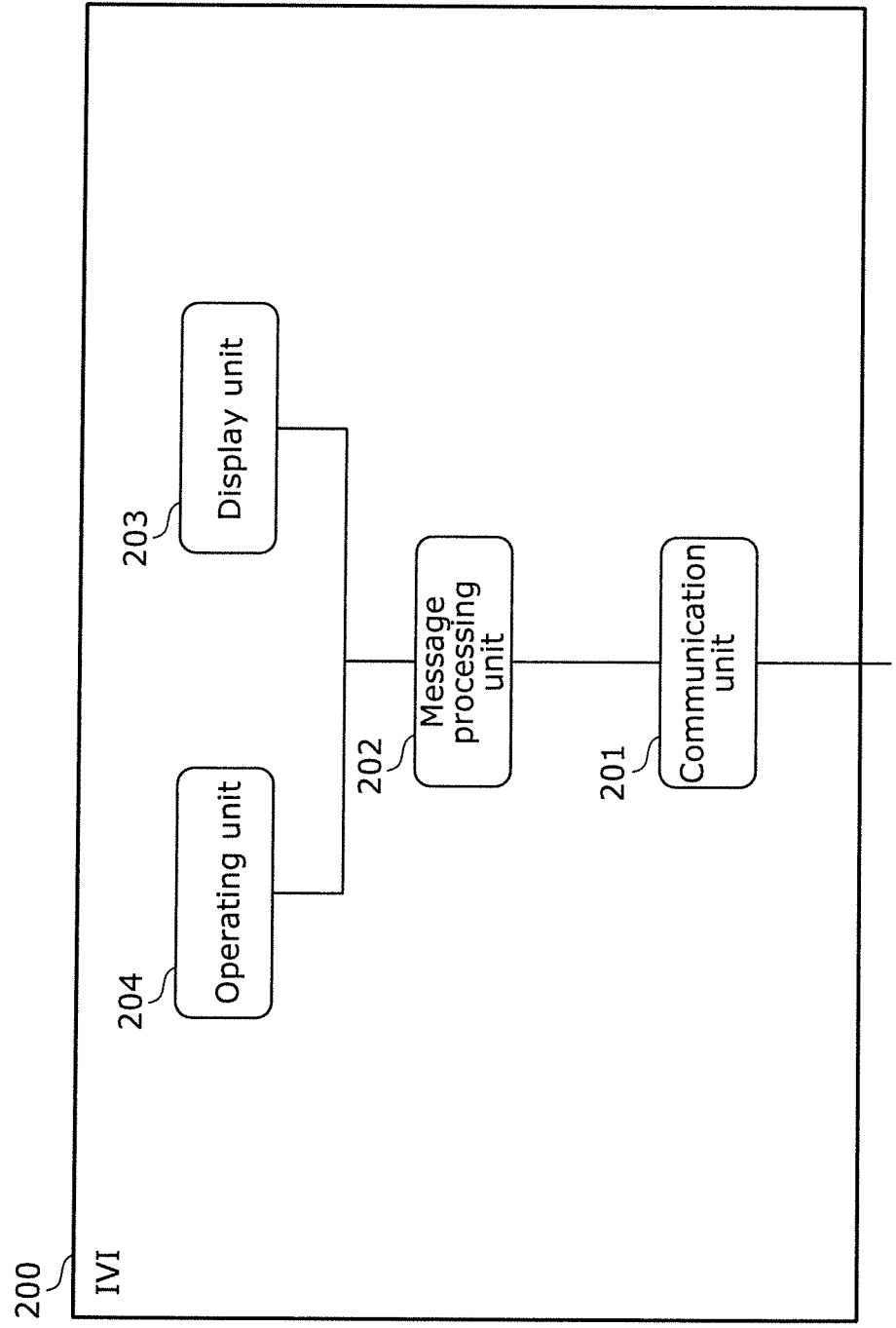
FIG. 4 illustrates an example of a configuration of an IVI according to Embodiment 1.

FIG. 4 illustrates an example of a configuration of the IVI 200 according to the present embodiment. The IVI 200 includes a communication unit 201, a message processing unit 202, a display unit 203, and an operating unit 204.

The communication unit 201 receives a message from another ECU and notifies the message processing unit 202 of the received message, via the Ethernet. The communication unit 201 transmits, to another ECU, the message notified by the message processing unit 202.

The message processing unit 202 extracts the details of the display target from the received message notified by the communication unit 201, and notifies the display unit 203 of the extracted details. The message processing unit 202 also generates a message to be transmitted, according to the notification details from the operating unit 204, and notifies the communication unit 201 of the generated message.

The display unit 203 performs processing for displaying, on the screen, the details of the display target notified by the message processing unit 202.

The operating unit 204 notifies the message processing unit 202 of the details corresponding to the operation made by the driver.

[1.5 Configuration of ECU]

Figure 5:
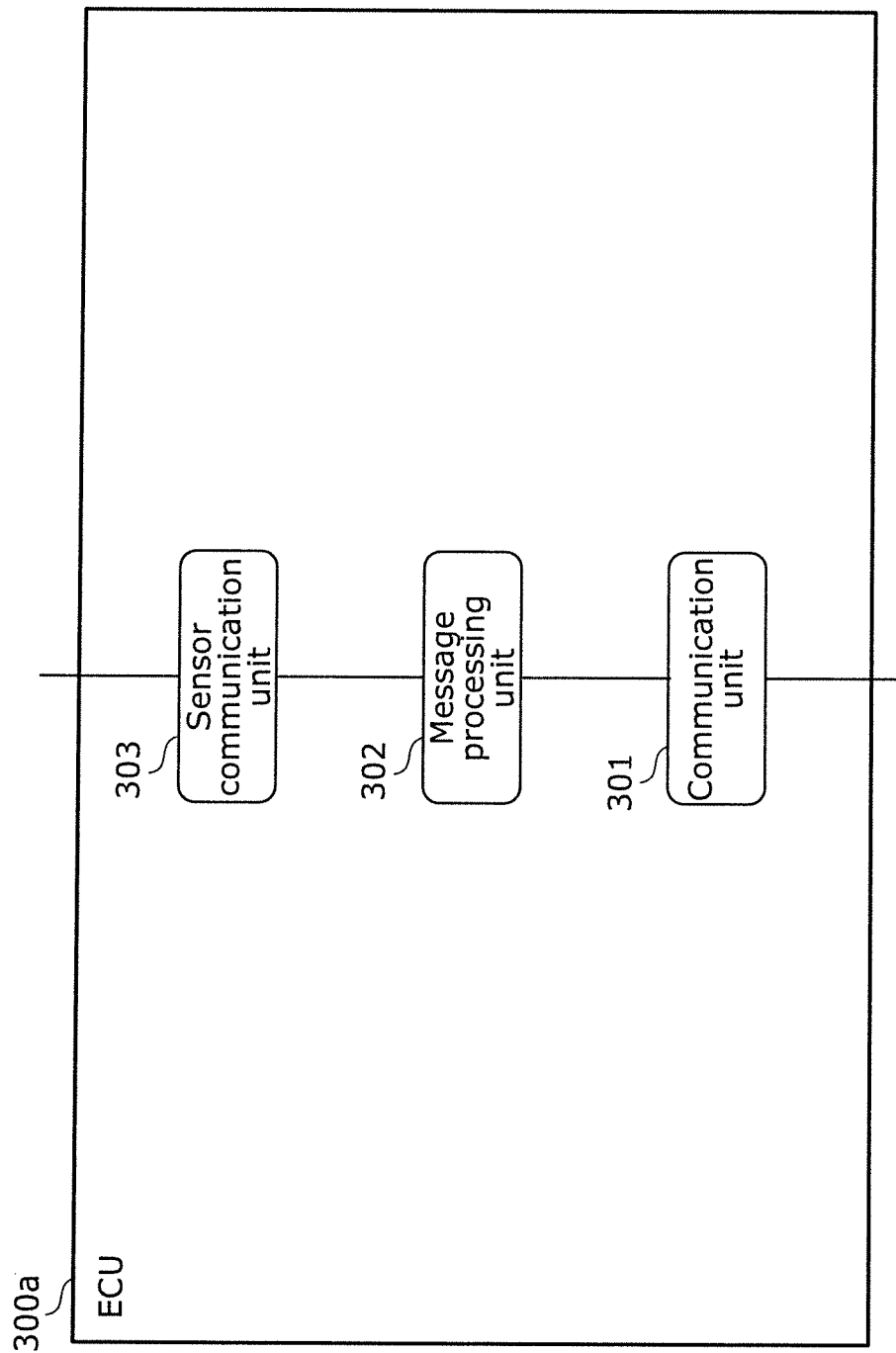
FIG. 5 illustrates an example of a configuration of an ECU according to Embodiment 1.

FIG. 5 illustrates an example of a configuration of the ECU 300a according to the present embodiment. The ECU 300a includes a communication unit 301, a message processing unit 302, and a sensor communication unit 303. Note that each of the ECU 300b to ECU 300d is the same as the ECU 300a in configuration, and thus, the descriptions thereof are omitted.

The communication unit 301 receives a message from another ECU and notifies the message processing unit 302 of the received message, via the Ethernet. The communication unit 301 also transmits, to another ECU, the message notified by the message processing unit 302.

The message processing unit 302 extracts the details of the instruction to a sensor and the like from the received message notified by the communication unit 301, and notifies the sensor communication unit 303 of the extracted details. The message processing unit 302 also generates a message to be transmitted, according the notification details from the sensor communication unit 303, and notifies the communication unit 301 of the generated message.

The sensor communication unit 303 obtains information from an external sensor or the like and notifies the message processing unit 302 of the details of the information. The sensor communication unit 303 also transmits an instruction to the external sensor or the like, according to the details of the instruction notified by the message processing unit 302.

An example of the message transmitted from the communication unit 301 of the ECU 300a to another ECU will be described with reference to FIG. 8.

[1.6 Configuration of CGW]

Figure 6:
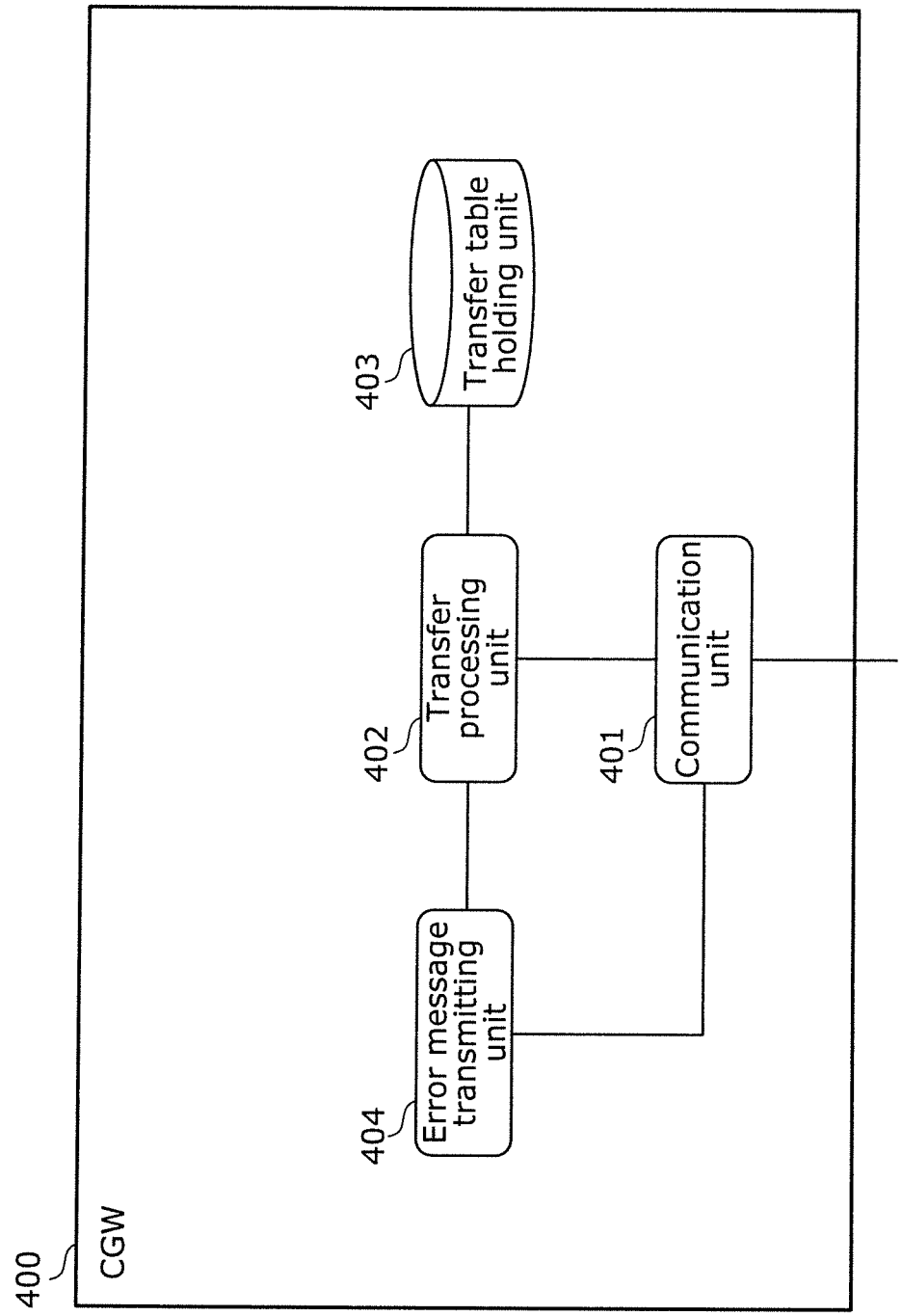
FIG. 6 illustrates an example of a configuration of a CGW according to Embodiment 1.

FIG. 6 illustrates an example of a configuration of the CGW 400 according to the present embodiment. The CGW 400 includes a communication unit 401, a transfer processing unit 402, a transfer table holding unit 403, and an error message transmitting unit 404.

The communication unit 401 receives a message from another ECU and notifies the transfer processing unit 402 of the received message, via the Ethernet. The communication unit 401 also transmits a message to the communication destination ECU notified by the transfer processing unit 402 and the error message transmitting unit 404.

The transfer processing unit 402 notifies the communication unit 401 of the transfer destination, based on the transfer table obtained from the transfer table holding unit 403. When the message cannot be transferred based on the transfer table, the transfer processing unit 402 may notify the error message transmitting unit 404 that the message cannot be transferred.

The transfer table holding unit 403 holds a transfer table.

The error message transmitting unit 404 notifies the communication unit 401 to transmit an error message based on the result notified by the transfer processing unit 402.

[1.7 Configuration of TCU]

Figure 7:
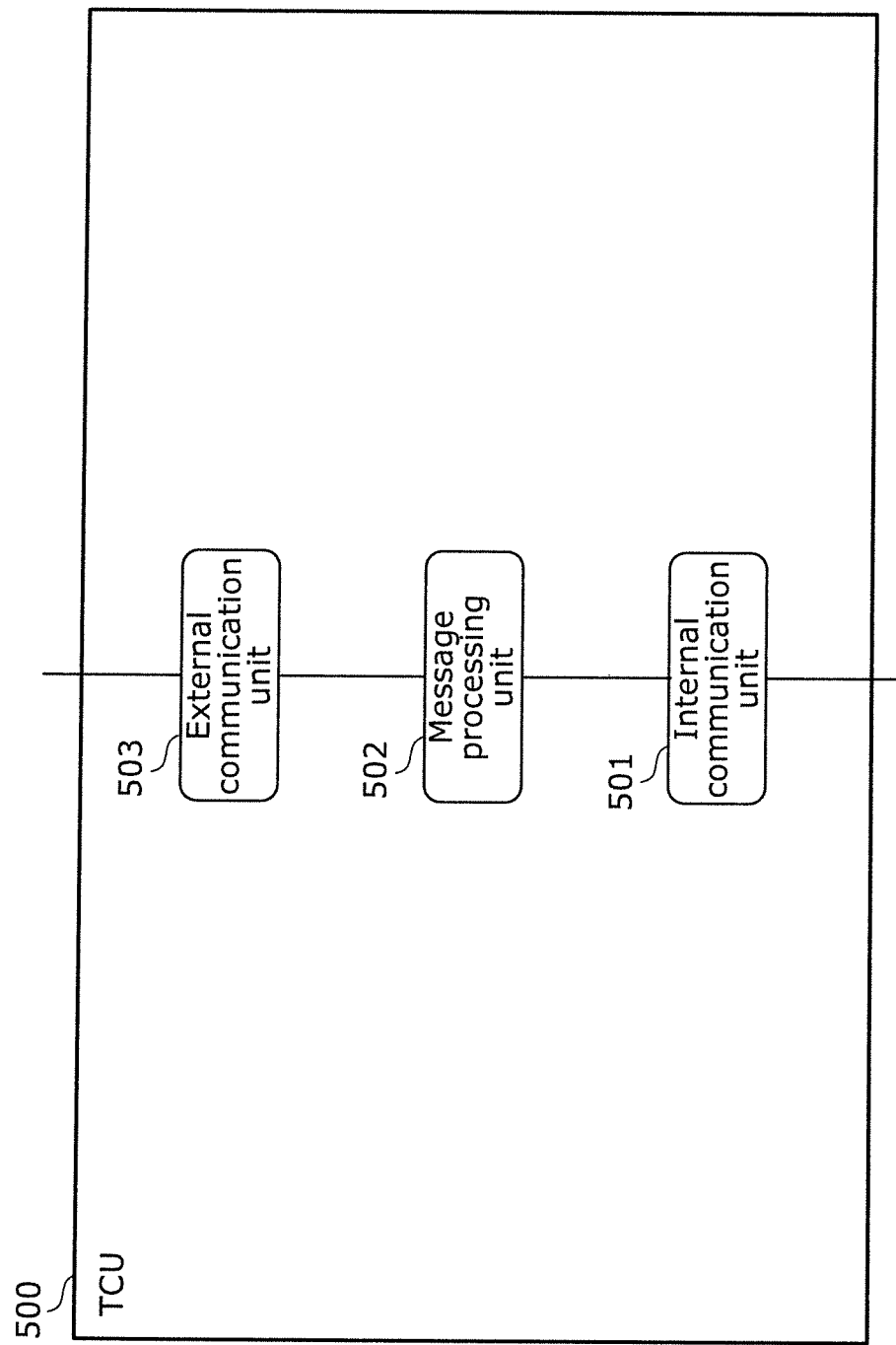
FIG. 7 illustrates an example of a configuration of a TCU according to Embodiment 1.

FIG. 7 illustrates an example of a configuration of the TCU 500 according to the present embodiment. The TCU 500 includes an internal communication unit 501, a message processing unit 502, and an external communication unit 503.

The internal communication unit 501 receives a message from another ECU and notifies the message processing unit 502 of the received message, via the Ethernet. The internal communication unit 501 also transmits, to another ECU, the message notified by the message processing unit 502.

The message processing unit 502 extracts the details to be externally transmitted, from the received message notified by the internal communication unit 501, and notifies the external communication unit 503 of the extracted details. The message processing unit 502 also generates a message of the details to be internally transmitted, according to the notification details from the external communication unit 503, and notifies the internal communication unit 501 of the generated message.

The external communication unit 503 communicates with the base station 600 outside the vehicle, and notifies the message processing unit 502 of the received message. The external communication unit 503 also transmits a message to the base station 600 outside the vehicle according to the details of the transmission target notified by the message processing unit 502.

[1.8 Example of Fields Included in Message Transmitted from ECU]

FIG. 8 illustrates an example of fields included in a message transmitted from the ECU 300a according to the present embodiment. Note that the messages transmitted from the ECU 300b to ECU 300e are approximately the same as the message transmitted from the ECU 300a, and thus, the descriptions thereof are omitted.

A MAC header includes a source MAC address and a destination MAC address. An IP header includes a TTL, a source IP address, and a destination IP address. The IP header may further include the type of the packet. An IP payload includes data body such as sensor data. For example, in the IP layer, each time a message is routed through a device, the TTL value included in the message decrements by 1. When the TTL value included in the message becomes 0 before the message reaches the destination, the message is discarded.

In the present embodiment, the ECU 300a transmits sensor data only to the ECU 300c. Accordingly, the ECU 300a sets the information of the ECU 300a to the source MAC address and the source IP address, and sets the information of the ECU 300c to the destination MAC address and the destination IP address. Moreover, the ECU 300a sets, to the TTL, the value of 1 which indicates that no router is interposed along its way.

[1.9 Structure of Transfer Table]

FIG. 9 illustrates an example of a structure of a transfer table held in the Ethernet switch 100a according to the present embodiment. Since the transfer table held in the Ethernet switch 100b is approximately the same as the transfer table held in the Ethernet switch 100a, the description thereof is omitted. In the transfer table in FIG. 9, the MAC addresses are associated with the Ethernet ports.

In FIG. 9, the Ethernet switch 100a includes six Ethernet ports having port numbers ranging from 1 to 6. Moreover, the connection MAC addresses of port numbers 1 to 6 are respectively 0a:0a:0a:0a:0a:0a, 0b:0b:0b:0b:0b:0b, 0c:0c:0c:0c:0c:0c, 0d:0d:0d:0d:0d:0d, 0e:0e:0e:0e:0e:0e, and 04:04:04:04:04:04.

[1.10 Structure of TTL Whitelist]

FIG. 10 illustrates an example of a structure of the TTL whitelist which is the whitelist held in the Ethernet switch 100a according to the present embodiment. The TTL whitelist held in the Ethernet switch 100b is approximately the same as the TTL whitelist held in the Ethernet switch 100a, and thus, the description thereof is omitted.

In FIG. 10, the TTL whitelist includes five sets of source MAC address, destination MAC address, and TTL. These five sets are correct combinations. When a message is included in these combinations, the message is transferred, and when the message is not included in the combinations, the message is discarded as an improper message.

[1.11 Determination Sequence Using TTL Whitelist]

Figure 11:
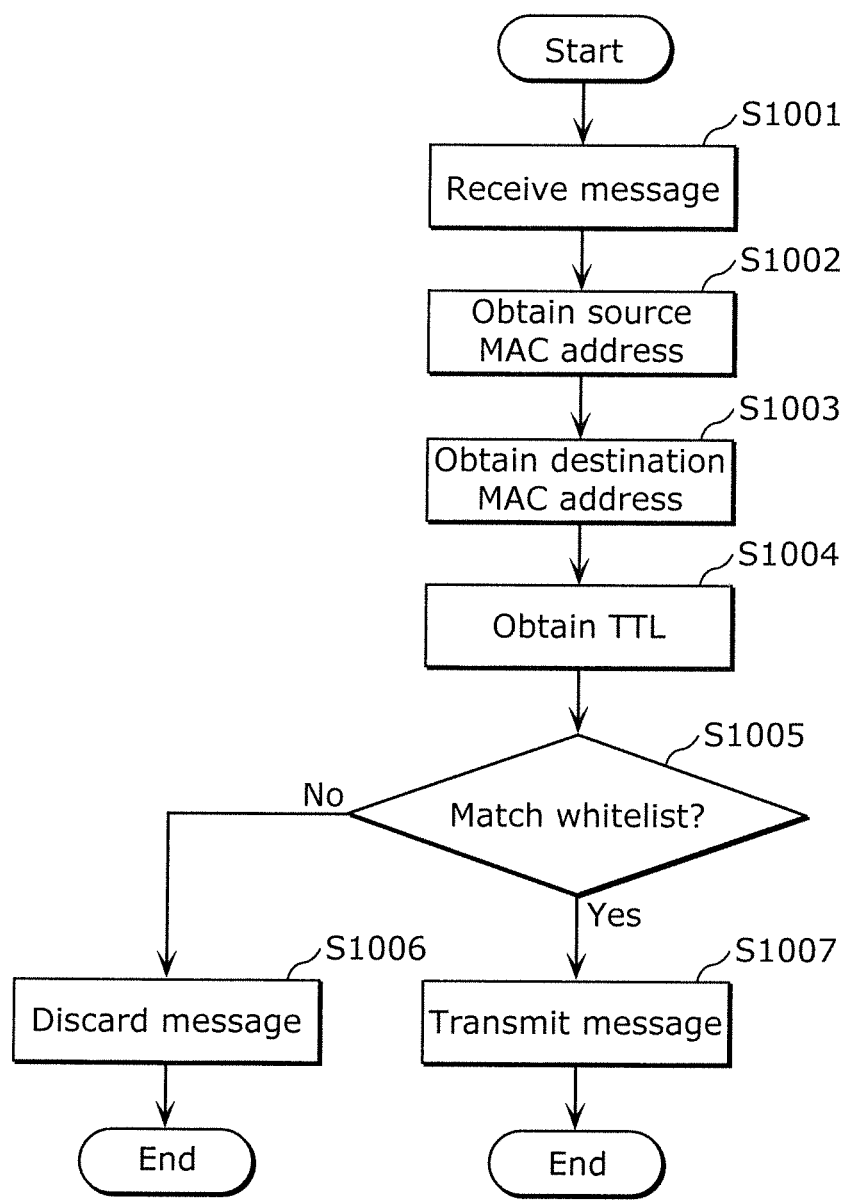
FIG. 11 illustrates an example of a message determination sequence which uses the TTL whitelist according to Embodiment 1.

FIG. 11 illustrates an example of a message determination sequence which uses the TTL whitelist by the Ethernet switch 100a according to the present embodiment.

In step S1001, the Ethernet switch 100a receives a message via an Ethernet port of the Ethernet switch 100a.

In step S1002, the Ethernet switch 100a obtains the source MAC address from the received message.

In step S1003, the Ethernet switch 100a obtains the destination MAC address from the received message.

In step S1004, the Ethernet switch 100a obtains the TTL value from the received message.

In step S1005, the Ethernet switch 100a checks the received message against the TTL whitelist. The Ethernet switch 100a then checks whether or not the TTL value in the received message is a correct value, based on the TTL value in the TTL whitelist corresponding to the source MAC address and the destination MAC address. In other words, the Ethernet switch 100a determines whether or not the TTL obtained from the received message matches the TTL whitelist.

For example, when the TTL value in the received message is less than or equal to the TTL value in the TTL whitelist, the Ethernet switch 100a determines that the TTL value in the received message is a correct value. When the TTL value in the received message is not less than or equal to the TTL value in the TTL whitelist, the Ethernet switch 100a determines that the TTL value in the received message is not a correct value.

When the TTL value in the received message is a correct value (in case of Yes), the Ethernet switch 100a executes the processing of step S1007. When the TTL value in the received message is not a correct value (in case of No), the Ethernet switch 100a executes the processing of step S1006.

In step S1006, the Ethernet switch 100a discards the received message.

In step S1007, the Ethernet switch 100a transmits the message via the port to which a device having the destination MAC address is connected, according to the transfer table.

In the example of the received message in FIG. 8, the source MAC address is 0a:0a:0a:0a:0a:0a, and the destination MAC address is 0c:0c:0c:0c:0c:0c, and the TTL is 1. Since the set in FIG. 8 matches the TTL whitelist in FIG. 10, the Ethernet switch 100a determines in step S1005 that the TTL value is correct, and transfers the message.

Advantageous Effects of Embodiment 1

In the present embodiment, such a message that deviates from a predetermined communication range is discarded based on the TTL whitelist including MAC addresses. Accordingly, data leakage is prevented.

Variation 1 of Embodiment 1

Although the TTL whitelist associated with MAC addresses is used in the fundamental aspect of Embodiment 1, the TTL whitelist is not limited to such an example. In the present variation, in an L3 switch which performs transfer control in the IP layer, a TTL whitelist associated with IP addresses is used. Accordingly, the validity of the message is appropriately determined based on the IP addresses, regardless of falsification of the MAC address.

Moreover, in the present variation, instead of the Ethernet switch 100a illustrated in FIG. 1, an Ethernet switch 110a is used which is a variation of the Ethernet switch 100a. The Ethernet switch 110a is an L3 switch which performs transfer control in the IP layer. A variation of the Ethernet switch 100b is used instead of the Ethernet switch 100b, too. The variation of the Ethernet switch 100b is approximately the same as the Ethernet switch 110a, and thus, the description thereof is omitted.

Hereinafter, the Ethernet switch 110a which performs transfer control in the IP layer will be described with reference to the drawings. Note that the descriptions of the details which are the same as the fundamental aspect of the embodiment described above are omitted.

[1.12 Configuration of Ethernet Switch]

Figure 12:
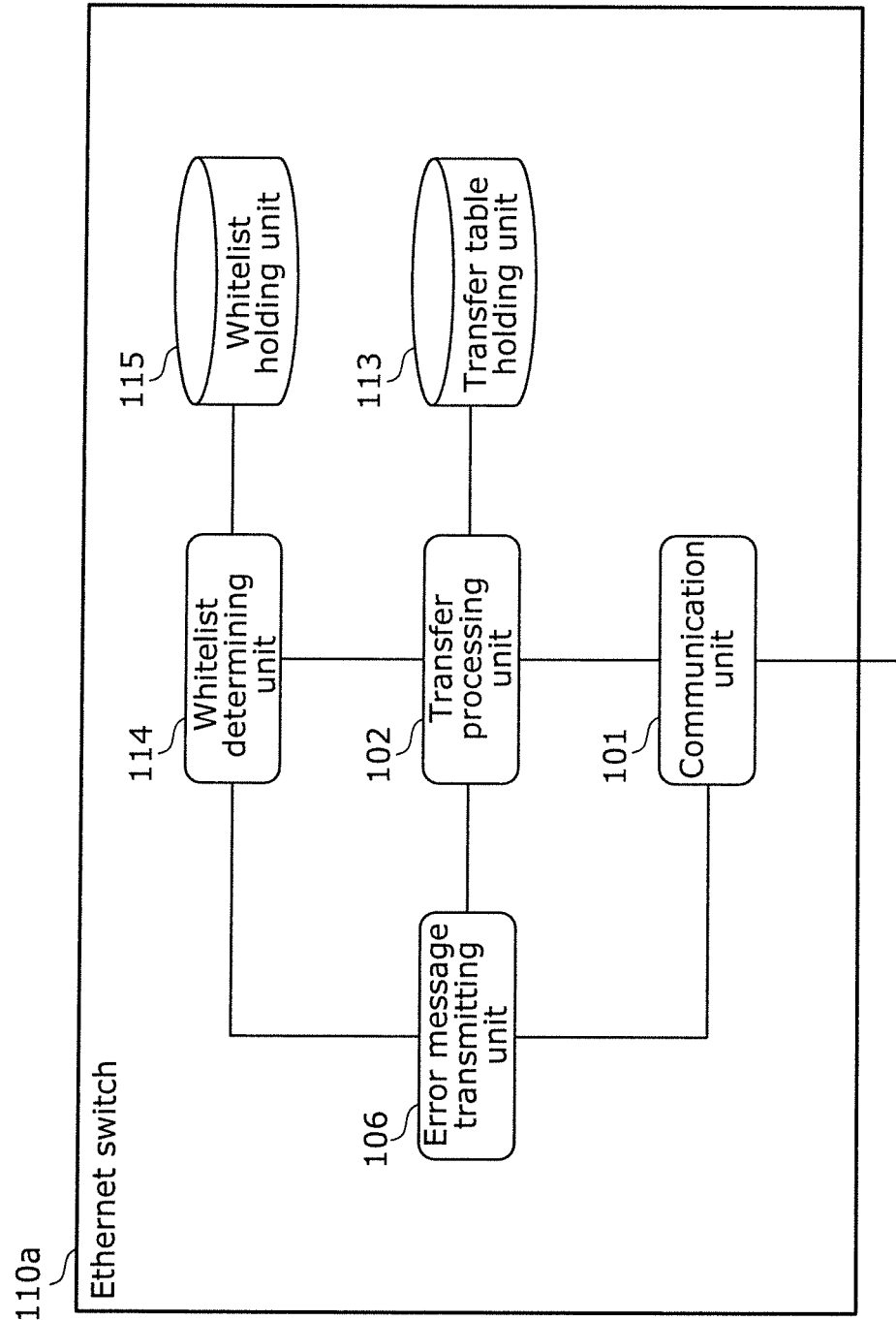
FIG. 12 illustrates an example of a configuration of an Ethernet switch according to Variation 1 of Embodiment 1.

FIG. 12 illustrates an example of a configuration of the Ethernet switch 110a according to the present variation. The Ethernet switch 110a includes: a communication unit 101; a transfer processing unit 102; a transfer table holding unit 113; a whitelist determining unit 114; a whitelist holding unit 115; and an error message transmitting unit 106. Note that the same reference numbers are assigned to the structural components which are the same as those in FIG. 3, and the descriptions thereof are omitted.

The transfer table holding unit 113 holds a transfer table. The details of the transfer table will be described with reference to FIG. 13.

The whitelist determining unit 114 makes determination on the message, according to the whitelist held in the whitelist holding unit 115 and the received message notified by the transfer processing unit 102. The whitelist determining unit 114 then notifies the transfer processing unit 102 and the error message transmitting unit 106 of the determination result.

The whitelist holding unit 115 holds a whitelist for determining whether or not the message can be transferred. The details of the whitelist will be described with reference to FIG. 14.

[1.13 Structure of Transfer Table]

FIG. 13 illustrates an example of a structure of a transfer table held in the Ethernet switch 110a according to the present variation. In the transfer table in FIG. 13, the IP addresses are associated with the Ethernet ports.

In FIG. 13, the Ethernet switch 110a includes six Ethernet ports having port numbers ranging from 1 to 6. Moreover, the connection IP addresses of port Nos. 1 to 6 are respectively, 192.168.0.1, 192.168.0.2, 192.168.0.3, 192.168.0.4, 192.168.0.5, and 192.168.0.127.

[1.14 Structure of TTL Whitelist]

FIG. 14 illustrates an example of a structure of the TTL whitelist which is the whitelist held in the Ethernet switch 110a according to the present variation.

In FIG. 14, the TTL whitelist includes five sets of source IP address, destination IP address, and TTL. These five sets are correct combinations. When a message is included in these combinations, the message is transferred, and when the message is not included in the combinations, the message is discarded as an improper message.

[1.15 Determination Sequence Using TTL Whitelist]

Figure 15:
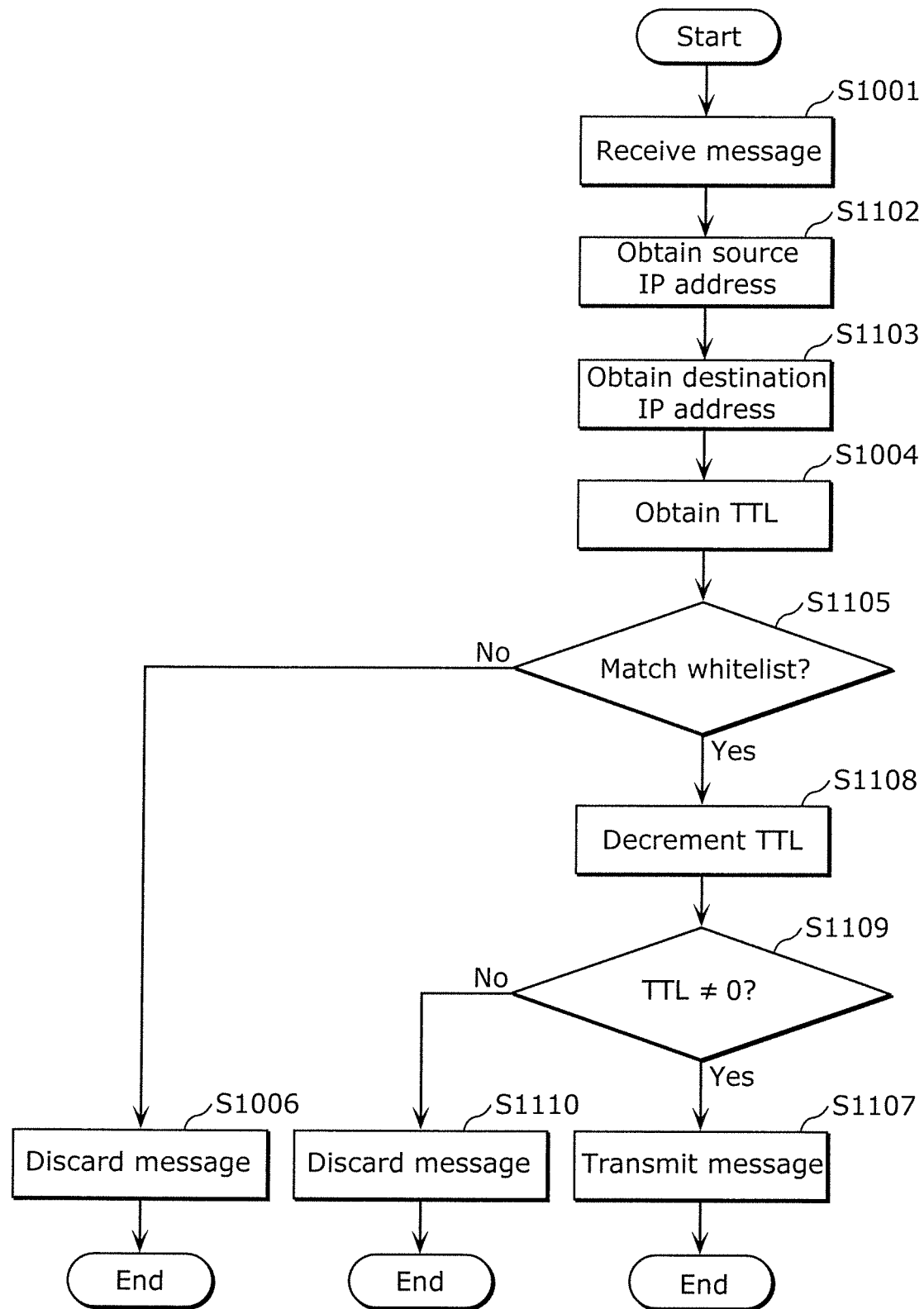
FIG. 15 illustrates an example of a message determination sequence which uses the TTL whitelist according to Variation 1 of Embodiment 1.

FIG. 15 illustrates an example of a message determination sequence which uses the TTL whitelist by the Ethernet switch 110a according to the present variation. The same reference numbers are assigned to the processing which are the same as those in FIG. 11, and the descriptions thereof are omitted.

In step S1102, the Ethernet switch 110a obtains the source IP address from the received message.

In step S1103, the Ethernet switch 110a obtains the destination IP address from the received message.

In step S1105, the Ethernet switch 110a checks the received message against the TTL whitelist. The Ethernet switch 110a then checks whether or not the TTL value in the received message is a correct value, based on the TTL value in the TTL whitelist corresponding to the source IP address and the destination IP address. In other words, the Ethernet switch 110a determines whether or not the TTL obtained from the received message matches the TTL whitelist.

For example, when the TTL value in the received message is less than or equal to the TTL value in the TTL whitelist, the Ethernet switch 110a determines that the TTL value in the received message is a correct value. When the TTL value in the received message is not less than or equal to the TTL value in the TTL whitelist, the Ethernet switch 110a determines that the TTL value in the received message is not a correct value.

When the TTL value in the received message is a correct value (in case of Yes), the Ethernet switch 110a executes the processing of step S1108. When the TTL value in the received message is not a correct value (in case of No), the Ethernet switch 110a executes the processing of step S1006.

In step S1108, the Ethernet switch 110a decrements the TTL value in the received message by 1 and overwrites the value.

In step S1109, the Ethernet switch 110a checks whether or not the TTL value in the received message is different from 0, that is, checks whether or not the TTL value is greater than 0. When the TTL value in the received message is 0 (in case of No), the Ethernet switch 110a executes the processing of step S1110. When the TTL value in the received message is different from 0 (in case of Yes), the Ethernet switch 110a executes the processing of step S1107.

In step S1110, the Ethernet switch 110a discards the received message.

In step S1107, the Ethernet switch 110a transmits the message via the port to which a device having the destination IP address is connected, according to the transfer table.

Advantageous Effects of Variation 1 of Embodiment 1

In the present variation, such a message that deviates from a predetermined communication range is discarded by the Ethernet switch based on the TTL whitelist including IP addresses. Moreover, the validity of the message is appropriately determined based on the IP addresses, regardless of falsification of the MAC address.

Variation 2 of Embodiment 1

In Variation 1 of Embodiment 1, the TTL whitelist which includes fixed sets of static IP addresses is used. In the present variation, a TTL whitelist is used which includes sets of dynamic IP addresses which are changed using an internet control message protocol (hereinafter, referred to as ICMP) or the like after the start of the system.

Accordingly, even when a physical change such as removal or replacement of an ECU occurs under the environment where the IP address and the like are not statically obtained, such as dynamic host configuration protocol (hereinafter, DHCP), determination of the message using the TTL whitelist is appropriately performed.

Moreover, in the present variation, instead of the Ethernet switch 100a illustrated in FIG. 1, an Ethernet switch 120a is used which is a variation of the Ethernet switch 100a. The Ethernet switch 120a is an L3 switch which performs transfer control in the IP layer, and holds a TTL whitelist which is dynamically changed after the start of the system. A variation of the Ethernet switch 100b is used instead of the Ethernet switch 100b, too. The variation of the Ethernet switch 100b is approximately the same as the Ethernet switch 120a, and thus, the description thereof is omitted.

Hereinafter, the Ethernet switch 120a which holds a TTL whitelist which is dynamically changed after the start of the system will be described with reference to the drawings. Note that the descriptions of the details which are the same as the fundamental aspect of the embodiment and the variation described above are omitted.

[1.16 Configuration of Ethernet Switch]

Figure 16:
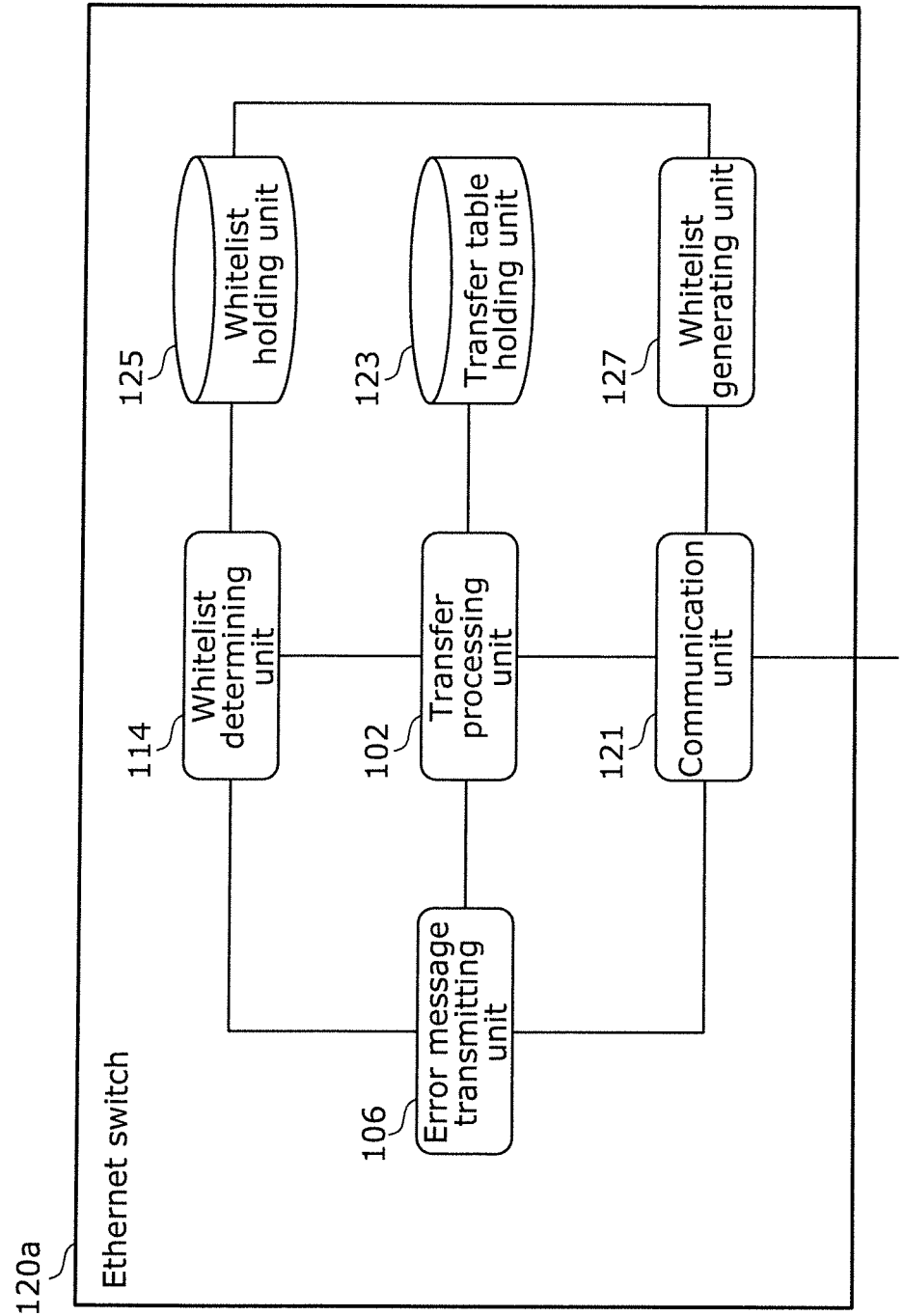
FIG. 16 illustrates an example of a configuration of an Ethernet switch according to Variation 2 of Embodiment 1.

FIG. 16 illustrates an example of a configuration of the Ethernet switch 120a according to the present variation. The Ethernet switch 120a includes: a communication unit 121; a transfer processing unit 102; a transfer table holding unit 123; a whitelist determining unit 114; a whitelist holding unit 125; an error message transmitting unit 106; and a whitelist generating unit 127. Note that the same reference numbers are assigned to the structural components which are the same as those in FIG. 3 or FIG. 12, and the descriptions thereof are omitted.

The communication unit 121 receives a message from another ECU, and notifies the transfer processing unit 102 and the whitelist generating unit 127 of the received message, via the Ethernet. The communication unit 121 also transmits a message to the destination ECU notified by the transfer processing unit 102, the error message transmitting unit 106, or the whitelist generating unit 127.

The whitelist holding unit 125 holds a whitelist which is for determining whether or not the message can be transferred, and which has been notified by the whitelist generating unit 127. An example of the whitelist is the same as FIG. 14, and thus, the description thereof is omitted.

The whitelist generating unit 127 generates an ICMP message and notifies the communication unit 121 of the generated ICMP message. Moreover, the whitelist generating unit 127 tallies the reply messages of the ICMP notified by the communication unit 121, generates a whitelist, and notifies the whitelist holding unit 125 of the generated whitelist.

For example, the whitelist is generated in a state where there is confirmation that no fraudulent device is connected to the in-vehicle network. The whitelist generating unit 127 may perform device authentication on the destination of the ICMP message by a challenge-response authentication or the like via the communication unit 121, before generating the whitelist. Subsequently, it may be that the whitelist generating unit 127 transmits the ICMP message to the device on which the device authentication has been performed, via the communication unit 121, and generates a whitelist according to the response.

Moreover, the whitelist generating unit 127 may regenerate the whitelist, when, for example, removal or replacement of an ECU occurs. In other words, the whitelist generating unit 127 may update the whitelist when removal or replacement of the ECU occurs.

Specifically, the whitelist generating unit 127 may detect the update of the IP address assigned to the ECU, and update the whitelist. Alternatively, the whitelist generating unit 127 may update the whitelist periodically. Accordingly, the whitelist is changed in accordance with, for example, the removal or the replacement of the ECU.

(Advantageous Effects of Variation 2 of Embodiment 1)

In the present variation, even under the environment where the IP address of each node is dynamically set by the DHCP, such a message that deviates from the communication range dynamically determined is discarded by the Ethernet switch.

Variation 3 of Embodiment 1

In Variation 1 of Embodiment 1, a message is checked against the TTL whitelist, and when the message does not match the TTL whitelist, the message is discarded. In the present variation, when the message does not match the TTL whitelist, the TTL of the message is updated with the TTL value in the whitelist. Accordingly, even when each of the ECUs is unlikely to set an appropriate value to the TTL in the message, an appropriate value is set by the Ethernet switch. As a result, the TTL whitelist is appropriately applied.

Moreover, in the present variation, an Ethernet switch 130*a* which is a variation of the Ethernet switch 100*a* is used instead of the Ethernet switch 100*a* illustrated in FIG. 1. The Ethernet switch 120*a* is an L3 switch which performs transfer control in the IP layer, and has a function of setting an appropriate value to the TTL. A variation of the Ethernet switch 100*b* is used instead of the Ethernet switch 100*b*, too. The variation of the Ethernet switch 100*b* is approximately the same as the Ethernet switch 130*a*, and thus, the description thereof is omitted.

Hereinafter, the Ethernet switch 130*a* having a function of setting an appropriate value to the TTL will be described with reference to the drawings. Note that the descriptions of the details which are the same as the fundamental aspect of the embodiment and the variations described above are omitted.

[1.17 Configuration of Ethernet Switch]

Figure 17:
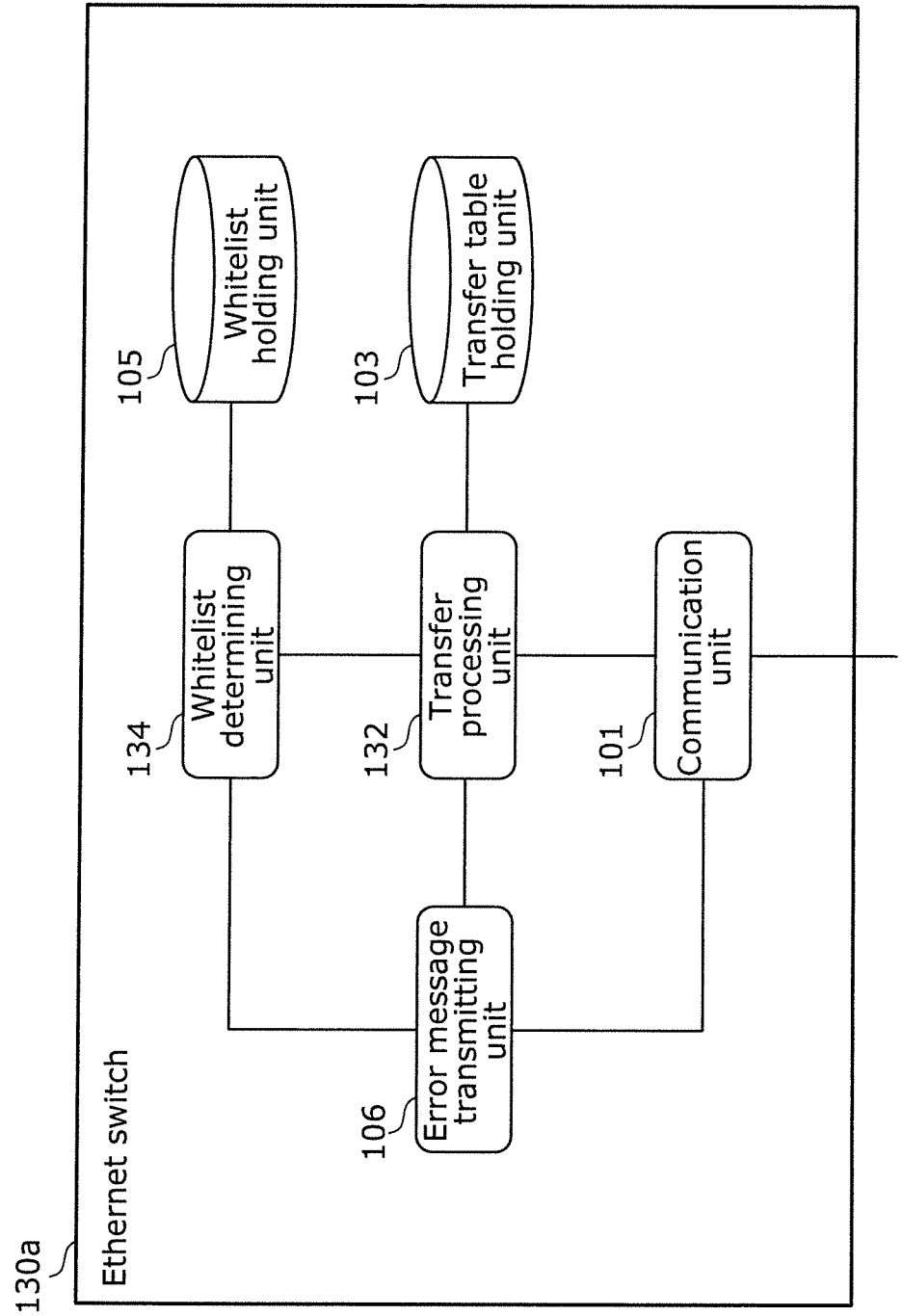
FIG. 17 illustrates an example of a configuration of an Ethernet switch according to Variation 3 of Embodiment 1.

FIG. 17 illustrates an example of a configuration of the Ethernet switch 130*a* according to the present variation. The Ethernet switch 130*a* includes: a communication unit 101; a transfer processing unit 132; a transfer table holding unit 103; a whitelist determining unit 134; a whitelist holding unit 105; and an error message transmitting unit 106. Note that the same reference numbers are assigned to the structural components which are the same as those in FIG. 3 or FIG. 12, and the descriptions thereof are omitted.

The transfer processing unit 132 updates the TTL value in the received message with the TTL value in the whitelist, according to the transfer table obtained from the transfer table holding unit 103 and the determination result of the whitelist determining unit 134, and notifies the communication unit 101 of the transfer destination.

The whitelist determining unit 134 makes determination on the message, according to the whitelist held in the whitelist holding unit 105 and the received message notified by the transfer processing unit 132. The whitelist determining unit 134 then notifies the transfer processing unit 132 and the error message transmitting unit 106 of the determination result and the TTL value in the whitelist.

[1.18 Example of Fields Included in Message Transmitted from ECU]

FIG. 18 illustrates an example of fields included in a message transmitted from the ECU 300*a* according to the present variation. Note that the messages transmitted from the ECU 300*b* to the ECU 300*e* are approximately the same as the message transmitted from the ECU 300*a*, and thus, the descriptions thereof are omitted.

A MAC header includes a source MAC address and a destination MAC address. An IP header includes a TTL, a source IP address, and a destination IP address. The IP header may further include the type of the packet. An IP payload includes data body such as sensor data.

In the present variation, the ECU 300*a* transmits sensor data only to the ECU 300*c*. Accordingly, the ECU 300*a* sets the information of the ECU 300*a* to the source MAC address and the source IP address, and sets the information of the ECU 300*c* to the destination MAC address and the destination IP address. Moreover, the ECU 300*a* does not set the value to the TTL individually, but sets, to the TTL, the value of 255 which is the upper limit value.

[1.19 Determination Sequence Using TTL Whitelist]

Figure 19:
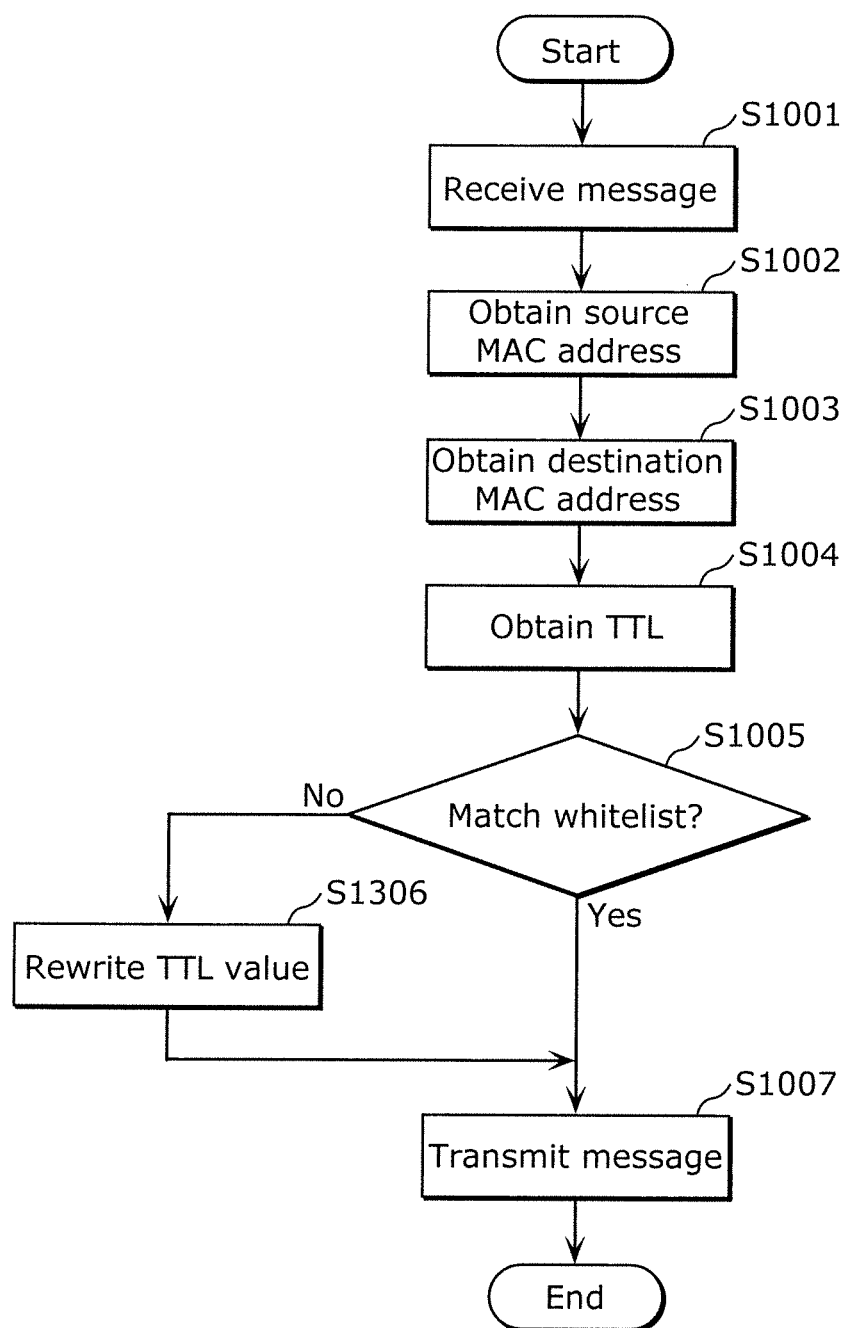
FIG. 19 illustrates an example of a message determination sequence which uses a TTL whitelist according to Variation 3 of Embodiment 1.

FIG. 19 illustrates an example of a message determination sequence which uses the TTL whitelist by the Ethernet switch 130*a* according to the present variation. The same reference numbers are assigned to the processing which are the same as those in FIG. 11, and the descriptions thereof are omitted.

In S1306, when the TTL value in the received message does not match the TTL whitelist (No in S1005), the Ethernet switch 130*a* updates the TTL value in the received message with the value in the TTL whitelist. The Ethernet switch 130*a* then executes processing of S1007.

(Advantageous Effects of Variation 3 of Embodiment 1)

In the present variation, even when each of the ECUs is unlikely to set an appropriate value to the TTL, an appropriate value is set by the Ethernet switch. Accordingly, the TTL whitelist is appropriately applied.

Embodiment 2

In Embodiment 1, information included in the received message is checked against the whitelist. In the present embodiment, time taken for transmission is obtained with use of the information included in the received message, and the obtained time taken for transmission is checked against the whitelist.

Moreover, in the present embodiment, instead of the Ethernet switch 100a illustrated in FIG. 1, an Ethernet switch 1110a is used which is a variation of the Ethernet switch 100a. The Ethernet switch 1110a is an L3 switch which performs transfer control in the IP layer, and has a function of obtaining time taken for transmission with use of the information included in the received message and checking the obtained time taken for the transmission against the whitelist. A variation of the Ethernet switch 100b is used instead of the Ethernet switch 100b, too. The variation of the Ethernet switch 100b is approximately the same as the Ethernet switch 1110a, and thus, the description thereof is omitted.

In the present embodiment, the Ethernet switch 1110a which has a function of obtaining time taken for transmission with use of the information included in the received message and checking the obtained time taken for the transmission against the whitelist will be described with reference to the drawings. Note that the descriptions of the details which are the same as the embodiments and the variations described above are omitted.

[2.1 Configuration of Ethernet Switch]

Figure 20:
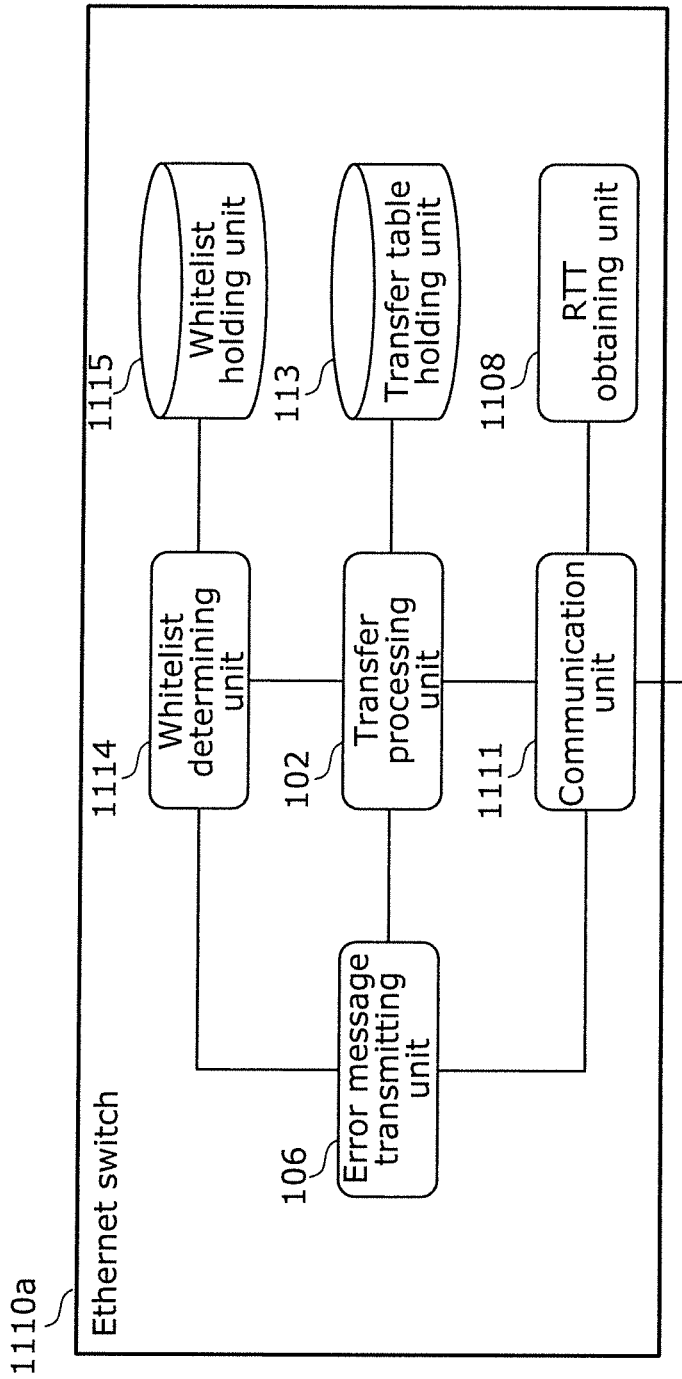
FIG. 20 illustrates an example of a configuration of an Ethernet switch according to Embodiment 2.

FIG. 20 illustrates an example of a configuration of the Ethernet switch 1110a according to the present embodiment. The Ethernet switch 1110a includes a communication unit 1111, a transfer processing unit 102, a transfer table holding unit 113, a whitelist determining unit 1114, a whitelist holding unit 1115, an error message transmitting unit 106, and an RTT obtaining unit 1108. Note that the same reference numbers are assigned to the structural components which are the same as those in FIG. 3 or FIG. 12, and the descriptions thereof are omitted.

The communication unit 1111 receives a message from another ECU and notifies the transfer processing unit 102 and the RTT obtaining unit 1108 of the received message, via the Ethernet. The communication unit 1111 also transmits a message to the destination ECU notified by the transfer processing unit 102, the error message transmitting unit 106, or the RTT obtaining unit 1108.

The whitelist determining unit 1114 makes determination on the message according to the whitelist held in the whitelist holding unit 1115 and the received message notified by the transfer processing unit 102. The whitelist determining unit 1114 then notifies the transfer processing unit 102 and the error message transmitting unit 106 of the determination result.

The whitelist holding unit 1115 holds an RTT whitelist for determining whether or not the message can be transferred. The details of the RTT whitelist will be described with reference to FIG. 21.

[2.2 Structure of RTT Whitelist]

FIG. 21 illustrates an example of a structure of the RTT whitelist which is the whitelist held in the Ethernet switch 1110a according to the present embodiment.

In FIG. 21, the RTT whitelist includes five sets of source IP address, destination IP address, and RTT. These five sets are correct combinations. When a message is included in these combinations, the message is transferred, and when the message is not included in the combinations, the message is discarded as an improper message.

A round trip time (RTT) is a time taken from when a signal is transmitted and till when a response is returned, for example, and corresponds to the time taken for transmission of the message. For example, the RTT in the RTT whitelist held in the Ethernet switch 1110a corresponds to the upper limit of the time taken from when the Ethernet switch 1110a transmits a signal to the destination IP address till when a response is returned.

[2.3 Determination Sequence Using RTT whitelist]

Figure 22:
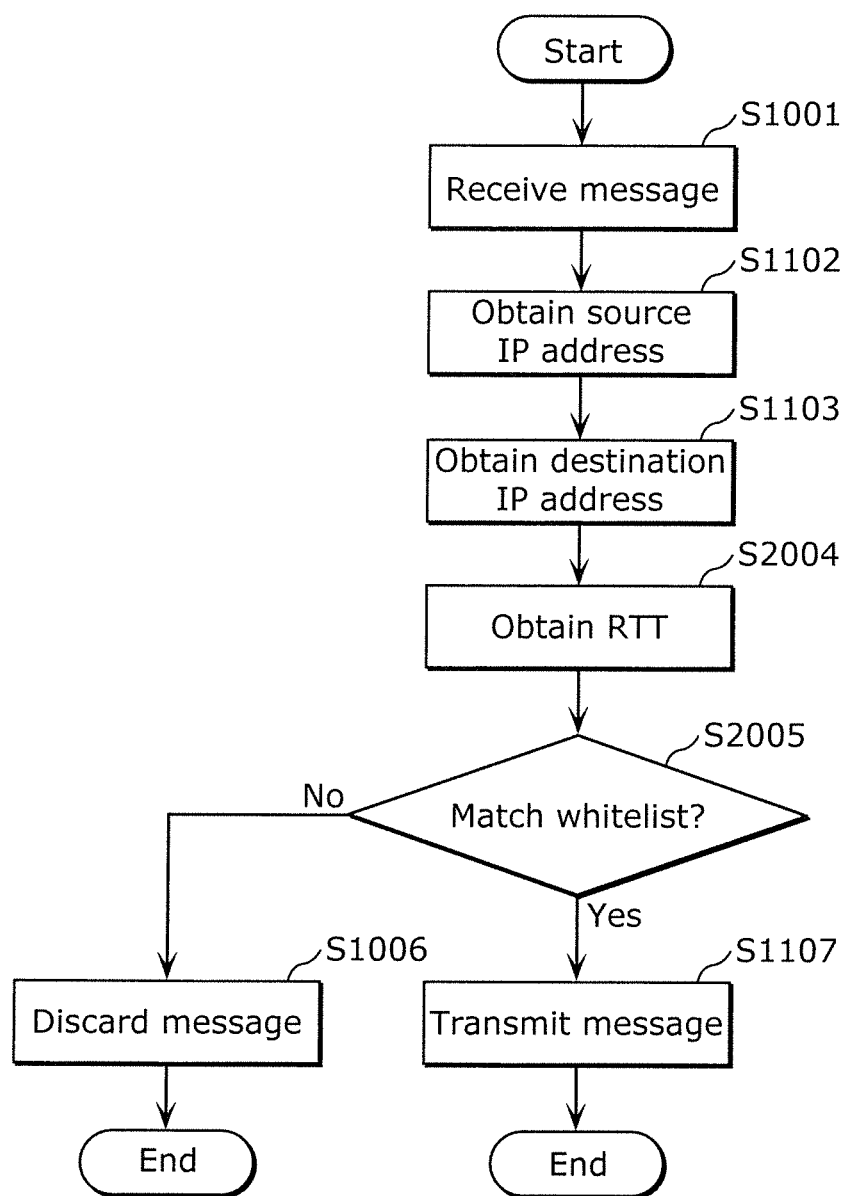
FIG. 22 illustrates an example of a message determination sequence which uses the RTT whitelist according to Embodiment 2.

FIG. 22 illustrates an example of a message determination sequence which uses the RTT whitelist by the Ethernet switch 1110a according to the present embodiment. The same reference numbers are assigned to the processing which are the same as those in FIG. 11 or in FIG. 15, and the descriptions thereof are omitted.

In S2004, the Ethernet switch 1110a transmits an ICMP message to the destination IP address of the received message, and obtains the RTT value based on the response time.

It may be that every time the Ethernet switch 1110a receives a message, the Ethernet switch 1110a transmits an ICMP message to the destination included in the message, and obtains the RTT value based on the response time. Moreover, it may be that the Ethernet switch 1110a obtains the RTT value based on the previous transmission result without transmitting an IPCM message to the same destination during a predetermined period after the IPCM message is transmitted and the RTT value is obtained.

In S2005, the Ethernet switch 1110a checks the RTT value obtained from the received message against the RTT whitelist. The Ethernet switch 1110a then checks whether or not the RTT value obtained from the received message is a value within the range of the RTT whitelist corresponding to the source IP address and the destination IP address. In other words, the Ethernet switch 1110a determines whether or not the RTT value obtained from the received message matches the RTT whitelist.

Here, when the obtained RTT value is a value within the range of the RTT whitelist (in case of Yes), the Ethernet switch 1110a executes the processing of S1107. In contrast, when the obtained RTT value is not a value within the range of the RTT whitelist (in case of No), the Ethernet switch 1110a executes the processing of S1006.

Note that the Ethernet switch 1110a may decrement the TTL included in the message, as illustrated in the example in FIG. 15.

Moreover, in the present embodiment, the RTT corresponds to the time taken from when a signal is transmitted from the Ethernet switch 1110a to the transmission destination till a response is returned. However, the RTT may correspond to the time taken from when a signal is transmitted from the transmission source to the transmission destination till when a response is returned from the transmission destination to the transmission source. In this case, the Ethernet switch 1110a may obtain, as the RTT, the total time of the time taken from when a signal is transmitted to the transmission destination till when a response is received, and the time taken from when a signal is transmitted to the transmission source till when a response is received.

(Advantageous Effects of Embodiment 2)

In the present embodiment, such a message that deviates from a predetermined communication range is discarded by the Ethernet switch based on the RTT whitelist including IP addresses. Moreover, the validity of the message is appropriately determined based on the IP addresses, regardless of falsification of the MAC address.

Variation of Embodiment 2

In the fundamental aspect of Embodiment 2, a fixed list preset as the RTT whitelist is used. In the present variation, a list which is dynamically updated by using the ICMP or the like after the start of the system is used as an RTT whitelist.

Accordingly, under the environment where an IP address and the like are not obtained statically, such as DHCP, even when a physical change such as removal or replacement of an ECU occurs, the validity of the message is appropriately determined.

Moreover, in the present variation, instead of the Ethernet switch 100a illustrated in FIG. 1, an Ethernet switch 1120a is used which is a variation of the Ethernet switch 100a. The Ethernet switch 1120a is an L3 switch which performs transfer control in the IP layer, and holds an RTT whitelist which is dynamically changed after the start of the system. A variation of the Ethernet switch 100b is used instead of the Ethernet switch 100b, too. The variation of the Ethernet switch 100b is approximately the same as the Ethernet switch 1120a, and thus, the description thereof is omitted.

Hereinafter, the Ethernet switch 1120a which holds a whitelist which is dynamically updated after the start of the system will be described with reference to the drawings. Note that the descriptions of the details which are the same as the embodiments and the variations described above are omitted.

[2.4 Configuration of Ethernet Switch]

Figure 23:
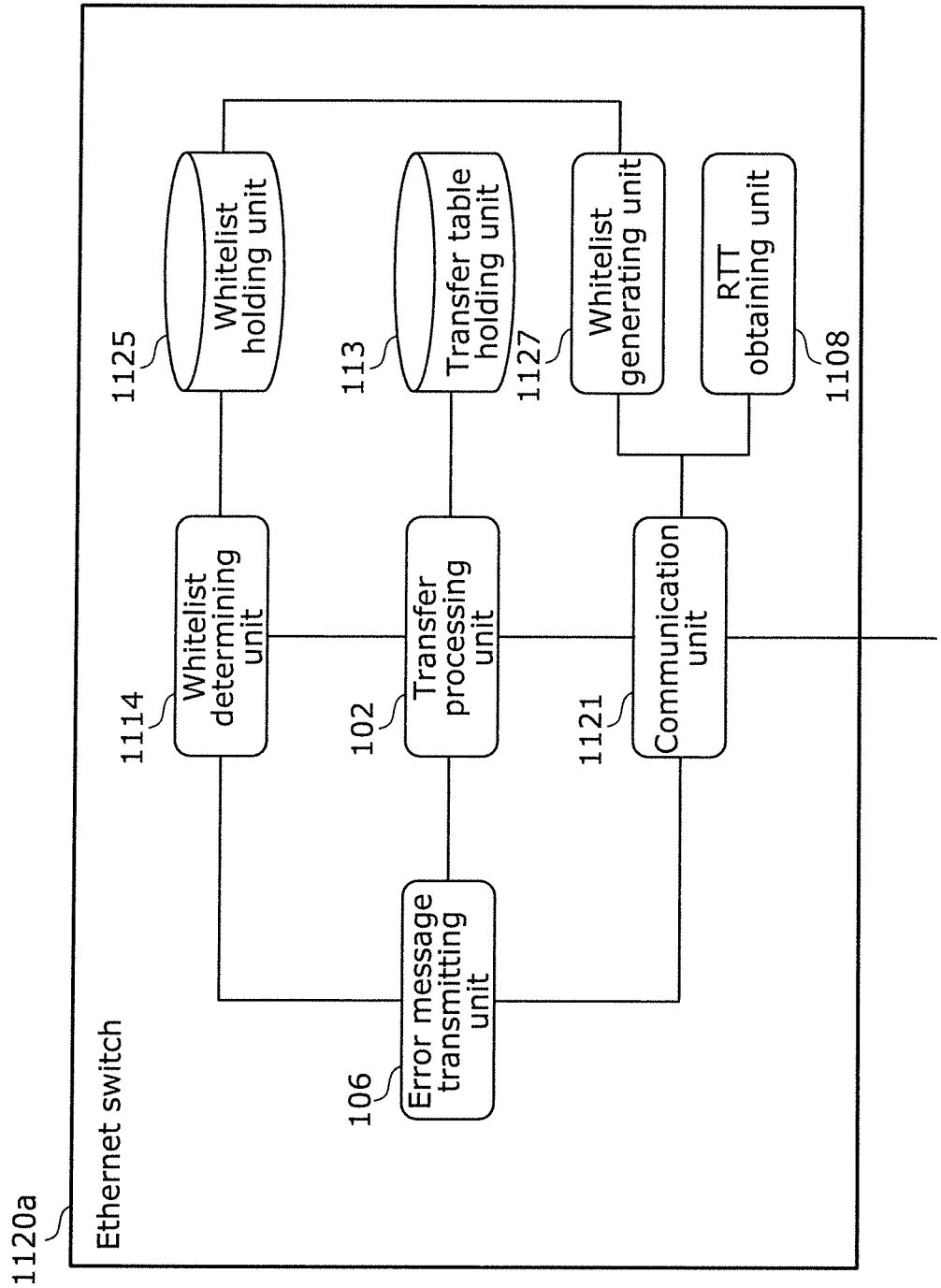
FIG. 23 illustrates an example of a configuration of an Ethernet switch according to a variation of Embodiment 2.

FIG. 23 illustrates an example of a configuration of the Ethernet switch 1120a according to the present variation. The Ethernet switch 1120a includes a communication unit 1121, a transfer processing unit 102, a transfer table holding unit 113, a whitelist determining unit 1114, a whitelist holding unit 1125, an error message transmitting unit 106, an RTT obtaining unit 1108, and a whitelist generating unit 1127. Note that the same reference numbers are assigned to the structural components which are the same as those in FIG. 3, FIG. 12, or FIG. 20, and the descriptions thereof are omitted.

The communication unit 1121 receives a message from another ECU, and notifies the transfer processing unit 102, the RTT obtaining unit 1108, or the whitelist generating unit 1127 of the received message, via the Ethernet. Moreover, the communication unit 1121 transmits the message to the destination ECU notified by the transfer processing unit 102, the error message transmitting unit 106, the RTT obtaining unit 1108, or the whitelist generating unit 1127.

The whitelist holding unit 1125 holds a whitelist which is for determining whether or not the message can be transferred, and which has been notified by the whitelist generating unit 1127. An example of the whitelist is the same as FIG. 21, and thus, the description thereof is omitted.

The whitelist generating unit 1127 generates an ICMP message, and notifies the communication unit 1121 of the generated ICMP message. Moreover, the whitelist generating unit 1127 tallies the reply messages of the ICMP notified by the communication unit 1121, generates a whitelist, and notifies the whitelist holding unit 1125 of the generated whitelist.

(Advantageous Effects of Variation of Embodiment 2)

In the present variation, even under the environment where the IP address of each node is dynamically set by the DHCP, such a message that deviates from the communication range dynamically determined is discarded by the Ethernet switch. Accordingly, data leakage is prevented.

Embodiment 3

In the present embodiment, a TTL whitelist which is associated with the state of the vehicle is used for determining the validity of a message. Accordingly, the validity of the message is appropriately determined according to the state of the vehicle.

[3.1 Overall Configuration of In-Vehicle Network System]

Figure 24:
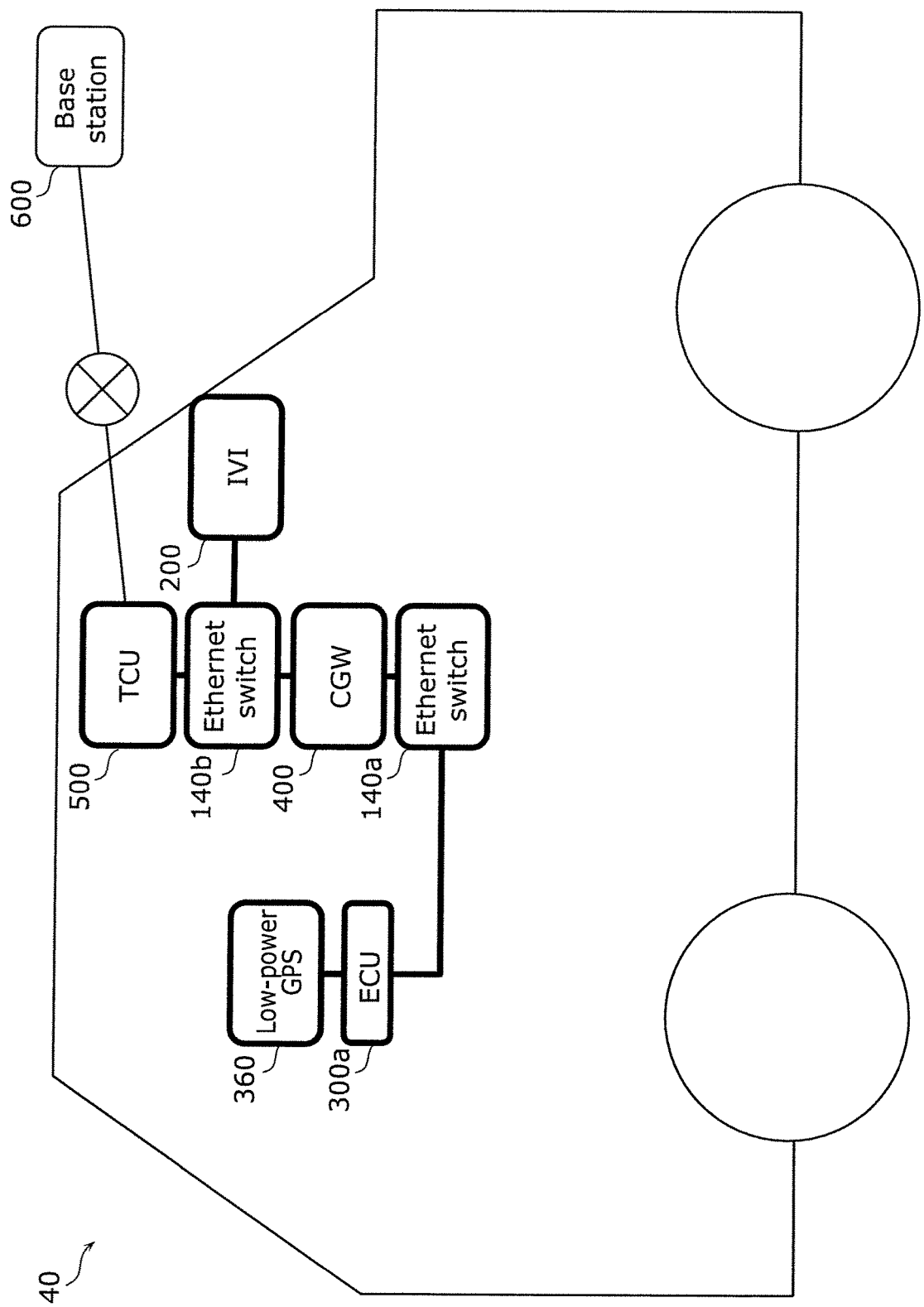
FIG. 24 illustrates an example of an overall configuration of an in-vehicle network system according to Embodiment 3.

FIG. 24 illustrates an example of an overall configuration of an in-vehicle network system according to the present embodiment. An in-vehicle network system 40 includes Ethernet switches 140a and 140b, an IVI 200, an ECU 300a, a CGW 400, and a TCU 500. Note that the same reference numbers are assigned to the structural components which are the same as those in FIG. 1, and the descriptions thereof are omitted.

The Ethernet switches 140a and 140b are interconnected via the CGW 400 and an Ethernet cable. The Ethernet switch 140a is connected to the ECU 300a via an Ethernet cable. Moreover, the Ethernet switch 140b is connected to the IVI 200 and the TCU 500 via Ethernet cables. Ethernet switches 140a and 140b each have a function of transferring the message received via a corresponding port to another port or all ports.

In the present embodiment, the ECU 300a is connected to a low-power global positioning system (GPS) 360. The ECU 300a also has a function of obtaining information from the low-power GPS 360, and transmitting the obtained information as a message to another ECU.

Note that a plurality of ECUs, which are not illustrated, may be mounted in a vehicle. A plurality of devices in the vehicle may be controlled by the ECUs.

Among the ECUs and the devices, some of the ECUs and the devices may operate only in the state where the vehicle is moving. Moreover, some of the ECUs and the devices may operate only in the state where the vehicle is stopped. Moreover, some of the ECUs and the devices may operate both in the state where the vehicle is moving and in the state where the vehicle is stopped. The ECU 300a and the low-power GPS 360 are examples of an ECU and a device which operate both in the state where the vehicle is moving and in the state where the vehicle is stopped.

In response to a change in state of the vehicle between moving and stopped, the communication range may also vary. Hence, the Ethernet switches 140a and 140b each hold a whitelist corresponding to the state of the vehicle.

[3.2 List of IP Addresses and MAC Addresses]

FIG. 25 illustrates an example of a list of IP addresses and MAC addresses according to the present embodiment. The example in FIG. 25 is basically the same as the example in FIG. 2. In the example in FIG. 25, however, some parts in the example in FIG. 2 are omitted for sake of simplicity. Moreover, in the case where a larger number of ECUs are mounted in the vehicle, the list can include a larger number of IP addresses and MAC addresses of the ECUs.

[3.3 Configuration of Ethernet Switch]

Figure 26:
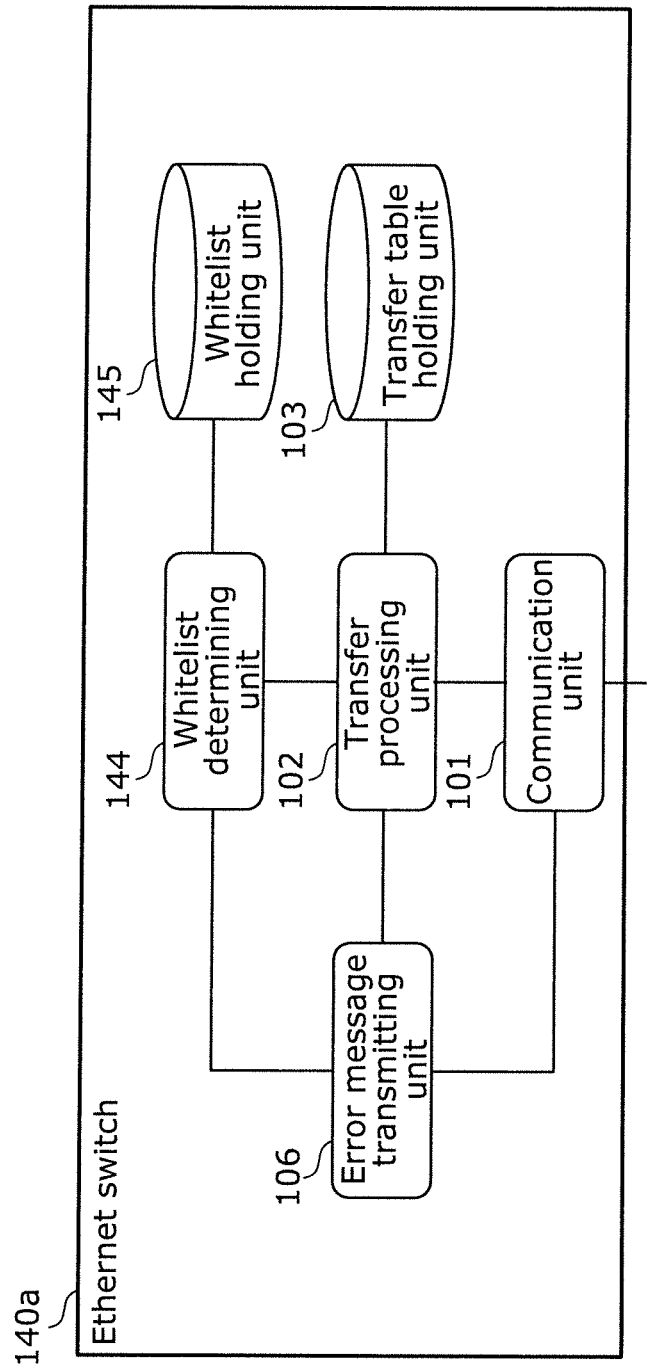
FIG. 26 illustrates an example of a configuration of an Ethernet switch according to Embodiment 3.

FIG. 26 illustrates an example of a configuration of the Ethernet switch 140a according to the present embodiment. The Ethernet switch 140a includes: a communication unit 101; a transfer processing unit 102; a transfer table holding unit 103; a whitelist determining unit 144; a whitelist holding unit 145; and an error message transmitting unit 106.

Note that the Ethernet switch 140b is the same as the Ethernet switch 140a in configuration, and thus, the description thereof is omitted. Note that the same reference numbers are assigned to the structural components which are the same as those in FIG. 3, and the descriptions thereof are omitted.

The whitelist determining unit 144 makes determination on the message, according to the state of the vehicle, the whitelist held in the whitelist holding unit 145, and the received message notified by the transfer processing unit

102. The whitelist determining unit 144 then notifies the transfer processing unit 102 and the error message transmitting unit 106 of the determination result.

The whitelist holding unit 145 holds a whitelist for determining whether or not the message can be transferred according to the state of the vehicle. The details of the whitelist will be described with reference to FIG. 29.

[3.4 Example of Fields Included in Message Transmitted from ECU]

FIG. 27 illustrates an example of fields included in a message transmitted from the ECU 300a according to the present embodiment.

A MAC header includes a source MAC address and a destination MAC address. An IP header includes a TTL, a source IP address, and a destination IP address. The IP header may further include the type of the packet. An IP payload includes data body such as sensor data.

The ECU 300a sets information of the ECU 300a to the source MAC address and the source IP address. The ECU 300a then appropriately sets the information of the transmission destination to the destination MAC address and the destination IP address. The destination MAC address and the destination IP address in FIG. 27 indicate virtual values. For example, the ECU 300a sets the MAC address and the IP address of the destination ECU not illustrated in FIG. 24 to the destination MAC address and the destination IP address in the message.

Moreover, in the example in FIG. 27, the ECU 300a sets, to the TTL in the message, the value of 32 which indicates the number of allowable transfers which is 31 times.

[3.5 Structure of Transfer Table]

FIG. 28 illustrates an example of a structure of a transfer table held in the Ethernet switch 140a according to the present embodiment. Since the transfer table held in the Ethernet switch 140b is approximately the same as the transfer table held in the Ethernet switch 140a, the description thereof is omitted. In the transfer table in FIG. 28, the MAC addresses are associated with the Ethernet ports.

In FIG. 28, the Ethernet switch 140a includes two Ethernet ports having port numbers ranging from 1 to 2. Moreover, the connection MAC addresses of the port No. 1 and No. 2 are, respectively, 0a:0a:0a:0a:0a:0a and 04:04:04:04:04:04.

Moreover, the Ethernet switch 140a may hold a larger number of Ethernet ports. In the case where a larger number of ECUs are mounted in the vehicle, the MAC addresses of the larger number of ECUs may be associated with the larger number of Ethernet ports.

[3.6 Structure of TTL Whitelist]

FIG. 29 illustrates an example of a structure of the TTL whitelist which is the whitelist held in the Ethernet switch 140a according to the present embodiment. The TTL whitelist held in the Ethernet switch 140b is approximately the same as the TTL whitelist held in the Ethernet switch 140a, and thus, the description thereof is omitted.

In FIG. 29, the TTL whitelist includes two sets of source MAC address, destination MAC address, state, and TTL. These two sets are correct combinations. When a message is included in these combinations, the message is transferred, and when the message is not included in the combinations, the message is discarded as an improper message.

The state in the TTL whitelist corresponds to the state of the vehicle. For example, the state in the TTL whitelist indicates one of a plurality of states including the state where the vehicle is stopped and the state where the vehicle is moving. Moreover, in the example in FIG. 29, the destination MAC address is indicated by "*". This "*" corresponds to any MAC address.

In the TTL whitelist in the example in FIG. 29, when the transmission source is the ECU 300a and the state of the vehicle is stopped, the TTL is restricted to the value of 32 regardless of the transmission destination. Moreover, when the transmission source is the ECU 300a and the state of the vehicle is moving, the TTL is restricted to the value of 2 regardless of the transmission destination.

[3.7 Determination Sequence Using TTL Whitelist]

Figure 30:
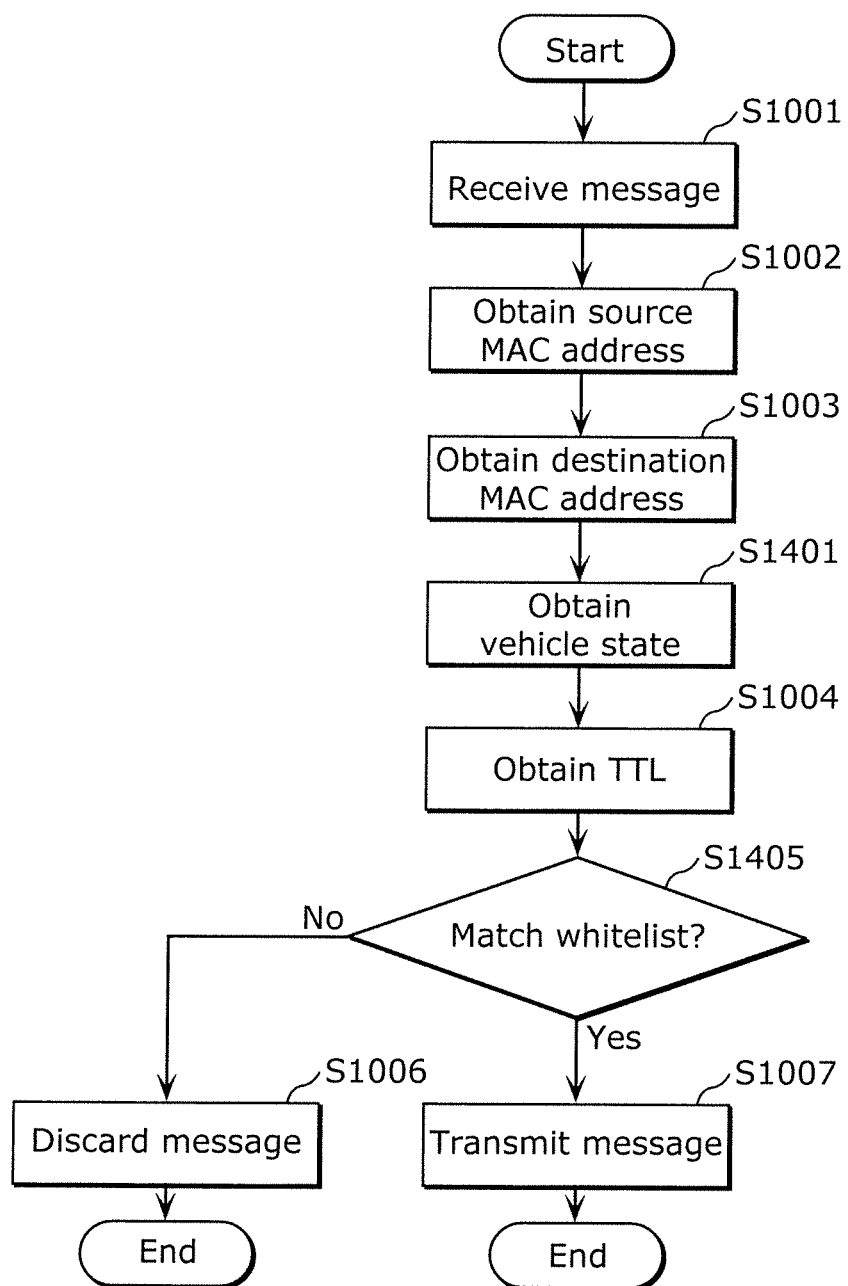
FIG. 30 illustrates an example of a message determination sequence which uses the TTL whitelist according to Embodiment 3.

FIG. 30 illustrates an example of a message determination sequence which uses the TTL whitelist by the Ethernet switch 140a according to the present embodiment. The same reference numbers are assigned to the processing which are the same as those in FIG. 11, and the descriptions thereof are omitted.

In step S1401, the Ethernet switch 140a obtains the state of the vehicle. The Ethernet switch 140a may obtain the state of the vehicle from the ECU, sensor, or the like not illustrated.

In step S1405, the Ethernet switch 140a checks the received message against the TTL whitelist according to the state of the vehicle. The Ethernet switch 140a then checks whether or not the TTL value in the received message is a correct value, based on the TTL value in the TTL whitelist corresponding to the source MAC address, the destination MAC address, and the state of the vehicle. In other words, the Ethernet switch 140a determines whether or not the TTL obtained from the received message matches the TTL whitelist.

For example, when the TTL value in the received message is less than or equal to the TTL value in the TTL whitelist, the Ethernet switch 140a determines that the TTL value in the received message is a correct value. When the TTL value in the received message is not less than or equal to the TTL value in the TTL whitelist, the Ethernet switch 140a determines that the TTL value in the received message is not a correct value. In the present embodiment, the TTL value in the TTL whitelist depends on the state of the vehicle.

When the TTL value in the received message is a correct value (in case of Yes), the Ethernet switch 140a executes the processing of step S1007. When the TTL value in the received message is not a correct value (in case of No), the Ethernet switch 140a executes the processing of step S1006.

In the example of the received message in FIG. 27, the source MAC address is 0a:0a:0a:0a:0a:0a, and the TTL is 32.

In the state where the vehicle is stopped, since the set in FIG. 27 matches the TTL whitelist in FIG. 29, the Ethernet switch 140a determines in step S1405 that the TTL value is correct, and transfers the message. In contrast, in the state where the vehicle is moving, since the set in FIG. 27 does not match the TTL whitelist in FIG. 29, the Ethernet switch 140a determines in step S1405 that the TTL value is not correct, and discards the message.

(Advantageous Effects of Embodiment 3)

In the present embodiment, such a message that deviates from the communication range corresponding to the state of the vehicle is discarded by the Ethernet switch based on the TTL whitelist including MAC addresses.

Variation of Embodiment 3

In the fundamental aspect of Embodiment 3, a TTL whitelist is used in which the state of the vehicle, the source MAC address, the destination MAC address, and the TTL are associated with one another. In the present variation, a TTL whitelist is used in which the state of the vehicle, the source IP address, the destination IP address, and the TTL are associated with one another.

Accordingly, the validity of the message is appropriately determined according to the state of the vehicle and the IP address. For example, in the L3 switch which performs transfer control in the IP layer, the validity of the message is determined appropriately according to the state of the vehicle, and transferring and discarding of the message are appropriately controlled.

Hereinafter, the Ethernet switch 140a which performs transfer control in the IP layer will be described with reference to the drawings. Note that the descriptions of the details which are the same as the embodiments and the variations described above are omitted. Note that the Ethernet switch 140b is the same as the Ethernet switch 140a in configuration, and thus, the description thereof is omitted.

[3.8 Configuration of Ethernet Switch]

The configuration of the Ethernet switch 140a according to the present variation is approximately the same as the configuration of the Ethernet switch 140a according to the fundamental aspect of Embodiment 3 illustrated in FIG. 26. However, the details of the transfer table held in the transfer table holding unit 103, the details of the determination processing performed by the whitelist determining unit 144, and the details of the whitelist held in the whitelist holding unit 145 are different from the fundamental aspect of Embodiment 3.

[3.9 Structure of Transfer Table]

In the transfer table according to the present variation, instead of the MAC addresses, the IP addresses are associated with the Ethernet ports. Specifically, the transfer table in the example in FIG. 28 has been changed so as to include the IP addresses instead of the MAC addresses. Here, 192.168.0.1 is used instead of 0a:0a:0a:0a:0a:0a, and 192.168.0.127 is used instead of 04:04:04:04:04:04.

[3.10 Structure of TTL Whitelist]

FIG. 31 illustrates an example of a configuration of the TTL whitelist which is the whitelist held in the Ethernet switch 140a according to the present variation.

In FIG. 31, the TTL whitelist includes two sets of source IP address, destination IP address, state, and TTL. These two sets are correct combinations. When a message is included in these combinations, the message is transferred, and when the message is not included in the combinations, the message is discarded as an improper message.

In a similar manner to FIG. 29, the state in the TTL whitelist illustrated in FIG. 31 corresponds to the state of the vehicle. For example, the state in the TTL whitelist indicates one of a plurality of states including the state where the vehicle is stopped and the state where the vehicle is moving. Moreover, in the example in FIG. 31, the destination IP addresses are indicated by "*". This "*" corresponds to any IP address.

Moreover, in a similar manner to the example in FIG. 29, in the TTL whitelist in the example in FIG. 31, when the transmission source is the ECU 300a and the state of the vehicle is stopped, the TTL is restricted to the value of 32 regardless of the transmission destination. Moreover, when the transmission source is the ECU 300a and the vehicle is moving, the TTL is restricted to the value of 2 regardless of the transmission destination.

[3.11 Determination Sequence Using TTL Whitelist]

Figure 32:
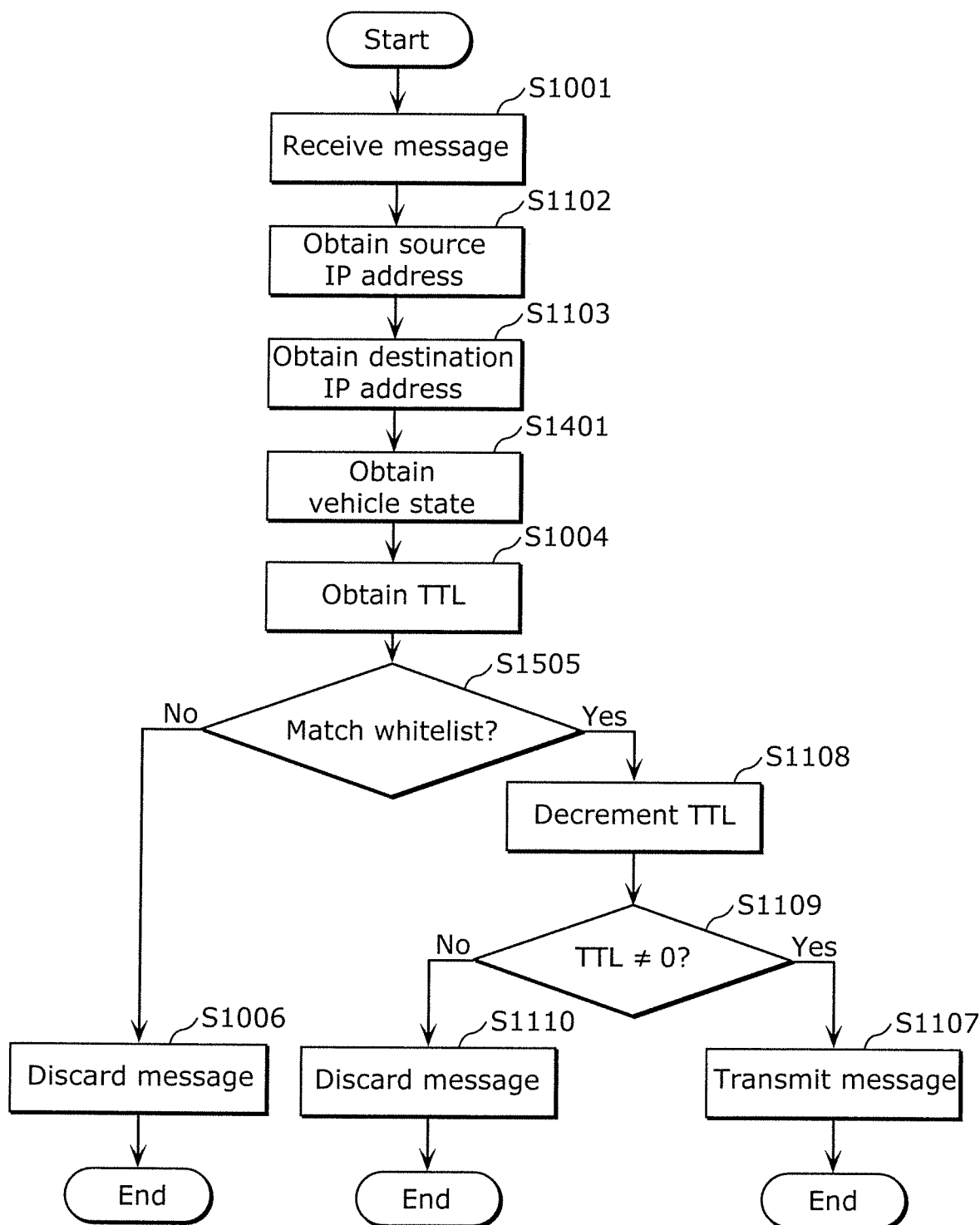
FIG. 32 illustrates an example of a message determination sequence which uses the TTL whitelist according to the variation of Embodiment 3.

FIG. 32 illustrates an example of a message determination sequence which uses the TTL whitelist by the Ethernet switch 140a according to the present variation. The same reference numbers are assigned to the processing which are the same as those in FIG. 30 or in FIG. 15, and the descriptions thereof are omitted.

In step S1505, the Ethernet switch 140a checks the received message against the TTL whitelist according to the state of the vehicle. The Ethernet switch 140a then checks whether or not the TTL value in the received message is a correct value, based on the TTL value in the TTL whitelist corresponding to the source IP address, the destination IP address, and the state of the vehicle. In other words, the Ethernet switch 140a determines whether or not the TTL obtained from the received message matches the TTL whitelist.

For example, when the TTL value in the received message is less than or equal to the TTL value in the TTL whitelist, the Ethernet switch 140a determines that the TTL value in the received message is a correct value. When the TTL value in the received message is not less than or equal to the TTL value in the TTL whitelist, the Ethernet switch 140a determines that the TTL value in the received message is not a correct value.

When the TTL value in the received message is a correct value (in case of Yes), the Ethernet switch 140a executes the processing of step S1108. When the TTL value in the received message is not a correct value (in case of No), the Ethernet switch 140a executes the processing of step S1006.

(Advantageous Effects of Variation of Embodiment 3)

In the present variation, the validity of the message is appropriately determined according to the state of the vehicle and the IP address. For example, in the L3 switch which performs transfer control in the IP layer, the validity of the message is determined appropriately according to the state of the vehicle, and transferring and discarding of the message is appropriately controlled.

Embodiment 4

In the present embodiment, an RTT whitelist is used in a similar manner to Embodiment 2, and the validity of the message is determined according to the state of the vehicle in a similar manner to Embodiment 3.

Moreover, in the present embodiment, an Ethernet switch 1140a which is a variation of the Ethernet switch 140a is used instead of the Ethernet switch 140a according to Embodiment 3 illustrated in FIG. 24. A variation of the Ethernet switch 140b is used instead of the Ethernet switch 140b, too. The variation of the Ethernet switch 140b is approximately the same as the Ethernet switch 1140a, and thus, the description thereof is omitted.

Hereinafter, the Ethernet switch 1140a according to the present embodiment will be described with reference to the drawings. Note that the descriptions of the details which are the same as the embodiments and the variations described above are omitted.

[4.1 Configuration of Ethernet Switch]

Figure 33:
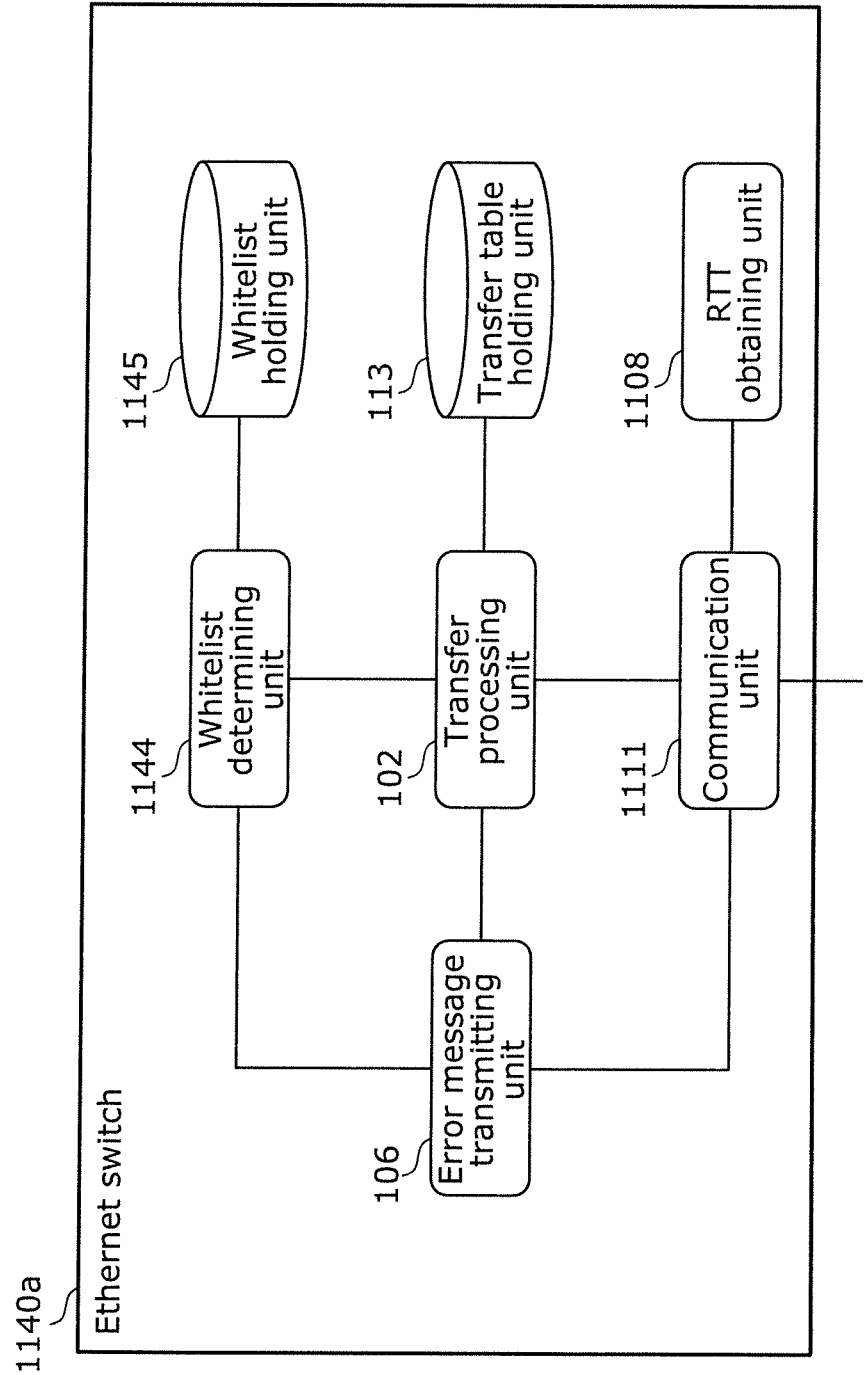
FIG. 33 illustrates an example of a configuration of an Ethernet switch according to Embodiment 4.

FIG. 33 illustrates an example of a configuration of the Ethernet switch 1140a according to the present embodiment. The Ethernet switch 1140a includes a communication unit 1111, a transfer processing unit 102, a transfer table holding unit 113, a whitelist determining unit 1144, a whitelist holding unit 1145, an error message transmitting unit 106, and an RTT obtaining unit 1108.

Note that the same reference numbers are assigned to the structural components which are the same as those in FIG. 3 or FIG. 12, and the descriptions thereof are omitted.

The whitelist determining unit 1144 makes determination on the message according to the whitelist held in the whitelist holding unit 1145 and the received message notified by the transfer processing unit 102. The whitelist determining unit 1144 then notifies the transfer processing unit 102 and the error message transmitting unit 106 of the determination result. The details of the determination performed by the whitelist determining unit 1144 will be described with reference to FIG. 35.

The whitelist holding unit 1145 holds an RTT whitelist for determining whether or not the message can be transferred. The details of the RTT whitelist held in the whitelist holding unit 1145 will be described with reference to FIG. 34.

[4.2 Structure of RTT Whitelist]

FIG. 34 illustrates an example of a structure of the RTT whitelist which is the whitelist held in the Ethernet switch 1140*a* according to the present embodiment.

In FIG. 34, the RTT whitelist includes two sets of source IP address, destination IP address, state, and RTT. These two sets are correct combinations. When a message is included in these combinations, the message is transferred, and when the message is not included in the combinations, the message is discarded as an improper message.

In a similar manner to FIG. 31, the state in the RTT whitelist illustrated in FIG. 34 corresponds to the state of the vehicle. For example, the state in the RTT whitelist indicates one of a plurality of states including the state where the vehicle is stopped and the state where the vehicle is moving. Moreover, in the example in FIG. 34, the destination IP addresses are indicated by "*". This "*" corresponds to any IP address.

Moreover, in the RTT whitelist in the example in FIG. 34, when the transmission source is the ECU 300*a* and the state of the vehicle is stopped, the RTT is restricted to 32 [msec] regardless of the transmission destination. Moreover, when the transmission source is the ECU 300*a* and the state of the vehicle is moving, the RTT is restricted to 2 [msec] regardless of the transmission destination.

[4.3 Determination Sequence Using RTT Whitelist]

Figure 35:
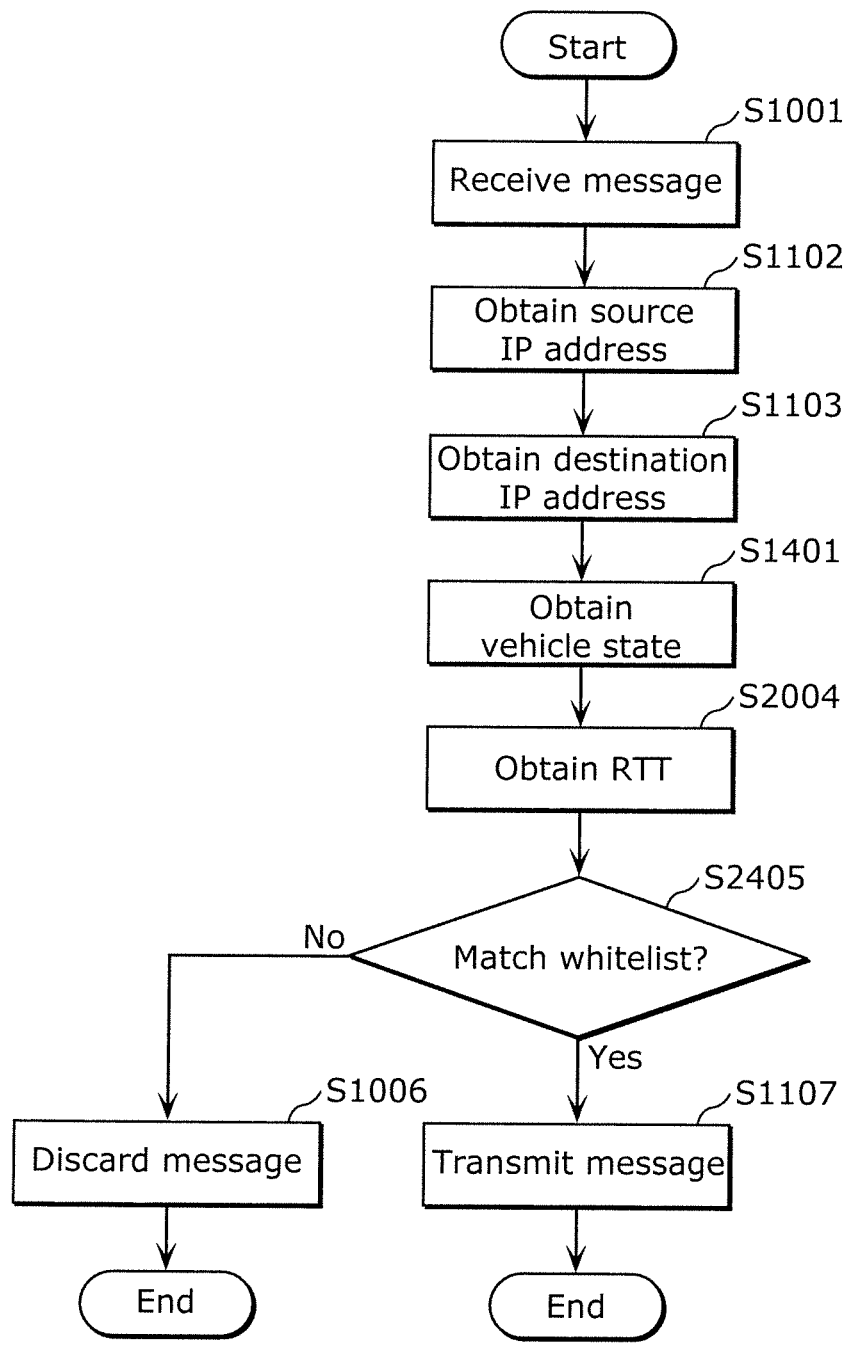
FIG. 35 illustrates an example of a message determination sequence which uses the RTT whitelist according to Embodiment 4.

FIG. 35 illustrates an example of a message determination sequence which uses the RTT whitelist by the Ethernet switch 1140*a* according to the present embodiment. The same reference numbers are assigned to the processing which are the same as those in FIG. 22 or in FIG. 30, and the descriptions thereof are omitted.

In S2405, the Ethernet switch 1140*a* checks the RTT value obtained from the received message against the RTT whitelist, according to the state of the vehicle. The Ethernet switch 1140*a* then checks whether or not the RTT value obtained from the received message is a value within the range of the RTT whitelist corresponding to the source IP address, the destination IP address, and the state of the vehicle.

In other words, the Ethernet switch 1140*a* determines whether or not the RTT value obtained from the received message matches the RTT whitelist. Here, when the obtained RTT value is a value within the range of the RTT whitelist (in case of Yes), the Ethernet switch 1140*a* executes the processing of S1107. When the obtained RTT value is not a value within the range of the RTT whitelist (in case of No), the Ethernet switch 1140*a* executes the processing of S1006.

(Advantageous Effects of Embodiment 4)

In the present embodiment, such a message that deviates from the communication range corresponding to the state of the vehicle is discarded by the Ethernet switch based on the RTT whitelist including IP addresses.

(Other Variations)

Although aspects of the communication device have been described based on the above embodiments and variations, the aspects of the communication device are not limited to the above embodiments and variations. The aspects of the communication device may be as follows.

(1) The Ethernet switches have been described in the above embodiments and variations. The Ethernet switches are examples of the communication device. The communication device may be any device which relays messages. For example, the communication device may be a CGW, a domain controller disposed in each domain, or a conversion device disposed between a Controller Area Network and Ethernet. Moreover, the communication device may be a device which determines the validity of the message without relaying the message.

(2) In the above embodiments and variations, each Ethernet switch holds a whitelist, transfers the message which matches the whitelist, and discards the message which does not match the whitelist. However, the Ethernet switch may hold a blacklist, transfer the message which does not match the blacklist, and discard the message which matches the blacklist. Moreover, the Ethernet switch may hold both the whitelist and the blacklist.

(3) In the above embodiments and variations, each Ethernet switch holds a whitelist, and discards the message which does not match the whitelist. However, when the message does not match the whitelist, the Ethernet switch may record the result of the mismatch as a log while transferring the message. The processing for recording the log may be performed by the error message transmitting unit or by the transfer processing unit. Moreover, the log may be recorded in a log holding unit which is not illustrated.

Moreover, when the message does not match the whitelist, the Ethernet switch may notify the transmission source of the message corresponding to the determination result by using ICMP while transferring the message to the transmission destination. This notification may be performed by the error message transmitting unit or by the transfer processing unit via the communication unit.

Moreover, the Ethernet switch may hold the items of message type and corresponding action, so that the corresponding action can be switched for each type of the message. For example, it may be that the Ethernet switch does not discard a specific type of message, but always records the determination result as a log. Alternatively, it may be that the Ethernet switch does not discard a specific type of message but records the determination result as a log when the determination result indicates that the message is improper. Instead of the type of the message, the transmission source or the transmission destination of the message may be used.

(4) In Variation 2 of Embodiment 1, and the variation of Embodiment 2, a DHCP environment has been described as an example of the dynamic environment. However, not only under the environment of DHCP, but also under the environment which corresponds to SOME/IP which changes the communication destination for each service, the Ethernet switch may update the TTL whitelist or the RTT whitelist by using ICMP and the like, each time the communication relation of the protocol of the service discovery is determined.

In other words, the source IP address or the destination IP address may be changed according not only to the DHCP but also to the SOME/IP. In response to the change in the source IP address or the change in the destination IP address, the TTL whitelist or the RTT whitelist may be changed.

(5) In Variation 3 of Embodiment 1, the Ethernet switch has a whitelist associated with MAC addresses. However, the Ethernet switch may hold a whitelist associated with IP addresses.

Moreover, in Variation 3 of Embodiment 1, when the TTL in the message does not match the whitelist, the Ethernet switch updates the message by using the value of the whitelist. However, the aspect of updating is not limited to the example illustrated in Variation 3 of Embodiment 1. For example, the Ethernet switch may update only the message which matches a specific value preset for each ECU, by using the value in the whitelist. Moreover, it may be that the Ethernet switch separately has a specific value preset for each ECU in the whitelist.

(6) In the above embodiments and variations, the in-vehicle network is an Ethernet network, but the in-vehicle network is not limited to the Ethernet network. The in-vehicle network may be CAN, CAN-FD, LIN, or Flexray, or may be a network made by combining all or part of these networks. Moreover, it may be that a wired LAN is used which conforms to IEEE 802.3 standard and the like which corresponds to the Ethernet.

Moreover, in the above embodiments and variations, the cyber security measures in the in-vehicle network mounted in a vehicle have been described. The range of application of the cyber security measures according to the present disclosure is not limited to the in-vehicle network mounted in the vehicle. The cyber security measures according to the present disclosure may be applied to a mobility network mounted in a mobility such as a construction equipment, agricultural machinery, vessel, railway, or airplane. In other words, the cyber security measures according to the present disclosure are applicable to the mobility network and the mobility network system.

(7) In the above embodiments and variations, each device is, specifically, a computer system including, for example, a microprocessor, a ROM, a RAM, a hard disk unit, a display unit, a keyboard, and a mouse. A computer program is stored in a RAM or a hard disk unit. Each device achieves its function as a result of the microprocessor operating according to the computer program. Here, the computer program is configured of a plurality of pieced together instruction codes indicating a command to the computer in order to achieve a given function.

(8) A structural component forming each device in the above embodiments and variations is, for example, an electrical circuit. The structural components may correspond to one electrical circuit as a whole or may respectively correspond to a plurality of electrical circuits. These electrical circuits may correspond to specialized hardware for performing predetermined operations, or may correspond to ordinary hardware for executing, for example, computer programs for performing predetermined operations.

Moreover, the structural component which holds information may be a memory, and the structural component which processes information may be a processor.

(9) Part or all of the structural components of each of the devices according to the embodiments and vitiations described above may be configured from one system large scale integration (LSI). A system LSI is a super-multifunction LSI manufactured with a plurality of components integrated on a single chip, and specifically corresponds to a computer system including a microprocessor, a ROM, and a RAM, for example. A computer program is stored in the RAM. The system LSI achieves its function as a result of the microprocessor operating according to the computer program.

Moreover, each of the structural components of each device described above may be individually configured as single chips or may be configured so that part or all of the structural components are included in a single chip.

The name used here is LSI, but it may also be called IC, LSI, super LSI, or ultra LSI depending on the degree of integration. Moreover, the circuit integration is not limited to LSI, but may be realized with a specialized circuit or a general-purpose processor. After manufacturing the LSI, a field programmable gate array (FPGA) or a reconfigurable processor that allows reconfiguration of the connection or configuration of the inner circuit cells of the LSI circuit may be used.

Moreover, when advancement in semiconductor technology or derivatives of other technologies brings forth a circuit integration technology which replaces LSI, it will be appreciated that such a circuit integration technology may be used to integrate the functional blocks. For example, application of biotechnology is also a possibility.

(10) Part or all of the structural components of each of the devices described above may each be configured from an IC card that is removable from the device or a stand-alone module. The IC card and the module are used in computer systems including, for example, a microprocessor, a ROM, and a RAM. The IC card and the module may include the super-multifunction LSI described above. The IC card and the module achieve its function as a result of the microprocessor operating according to the computer program. The IC card and the module may be tamperproof.

(11) The present disclosure may also be realized as the methods shown in the embodiments and the variations described above. Moreover, the present disclosure may also be used as a computer program for causing a computer to execute these methods, or a digital signal of the computer program.

Moreover, the present disclosure may also be used in a computer-readable recording medium on which the computer program or the digital signal is stored, such as a flexible disk, hard disk, CD-ROM, MO, DVD, DVD-ROM, DVD-RAM, Blu-ray (registered trademark) Disc (BD), or a semiconductor memory. Moreover, the present disclosure may also be used for the computer program or the digital signal stored on those recording media.

Moreover, the computer program or the digital signal may be transmitted via, for example, an electric communication line, a wireless or wired communication line, a network represented by the Internet, or data broadcasting.

Moreover, in a computer system including a microprocessor and a memory, the memory may store the computer program and the microprocessor may operate according to the computer program.

Moreover, the computer program or the digital signal may be used in another independent computer system by being stored on the recording medium and transmitted, or transmitted via the network, for example.

(12) Moreover, the embodiments and the variations described above may be partially or entirely combined. For example, a variation of a specific embodiment may be applied to another embodiment.

CONCLUSION

Hereinafter, the fundamental configuration, representative variations and the like indicated in the embodiments and the variations described above will be described. These may be partially or entirely combined, or combined with part of the above embodiments. Moreover, the structural components which are not indicated below are not necessarily be mounted.

(1) For example, the communication devices (100a, 100b, 110a, 120a, 130a, 140a, 140b, 1110a, 1120a, 1140a) according to one aspect of the present disclosure each are connected to a mobility network. The mobility network is a network mounted in a mobility, and is a network used by a plurality of electronic control devices for communication. The communication devices (100a, 100b, 110a, 120a, 130a, 140a, 140b, 1110a, 1120a, and 1140a) include holding units (105, 115, 125, 145, 1115, 1125, 1145), receiving units (101, 121, 1111, 1121), and determining units (104, 114, 134, 144, 1114, 1144).

The holding units (105, 115, 125, 145, 1115, 1125, 1145) each hold range information which indicates the transferable path range determined relative to the messages on the mobility network. The receiving units (101, 121, 1111, 1121) receive messages on the mobility network. The determining units (104, 114, 134, 144, 1114, 1144) each determine the validity of the received message by using the range information.

Accordingly, the communication devices (100a, 100b, 110a, 120a, 130a, 140a, 140b, 1110a, 1120a, 1140a) are capable of suppressing the situation where messages on the mobility network are transferred while exceeding the assumed range, and are capable of preventing data leakage.

(2) For example, in the communication devices (100a, 100b, 110a, 120a, 130a, 140a, 140b) described above, the range information indicates the range of time to live (TTL) as a transferrable path range. The determining units (104, 114, 134, 144) each then determine the validity of the received message by comparing the TTL value included in the received message with the TTL range indicated by the range information.

With this, the communication devices (100a, 100b, 110a, 120a, 130a, 140a, 140b) each are capable of determining the validity of the message based on whether or not an appropriate TTL value has been set to the message. Accordingly, the communication devices (100a, 100b, 110a, 120a, 130a, 140a, 140b) each are capable of suppressing the situation where messages are transferred while exceeding the assumed range, and are capable of preventing data leakage.

(3) For example, in the communication devices (1110a, 1120a, 1140a) described above, the range information indicates the range of round trip time (RTT) as the transferrable path range. The determining units (1114, 1144) each then determine the validity of the received message by comparing the RTT value derived from the information included in the received message with the RTT range indicated by the range information.

With this, the communication devices (1110a, 1120a, 1140a) each are capable of determining the validity of the message based on whether or not the RTT value to the message is within an appropriate range. Accordingly, the communication devices (1110a, 1120a, 1140a) are capable of suppressing the situation where messages are transferred while exceeding the assumed range, and are capable of preventing data leakage.

(4) For example, in the communication devices (100a, 100b, 110a, 120a, 130a, 140a, 140b, 1110a, 1120a, 1140a) described above, the range information indicates the transferrable path range determined according to the transmission source or the transmission destination. Accordingly, the communication devices (100a, 100b, 110a, 120a, 130a, 140a, 140b, 1110a, 1120a, 1140a) each are capable of appropriately determining the validity of the message by using the range information indicating the transferrable path range determined according to the transmission source or the transmission destination.

(5) For example, in the communication devices (100a, 100b, 140a, 140b) described above, the range information indicates a transferrable path range determined according to the source MAC address or the destination MAC address. Accordingly, even when the communication device is the L2 switch which transfers the message by using the MAC addresses, for example, the communication devices (100a, 100b, 140a, 140b) each are capable of appropriately determining the validity of the message by using the range information indicating the transferable path range determined according to the MAC addresses.

(6) For example, in the communication devices (110a, 120a, 130a, 1110a, 1120a, 1140a) described above, the range information indicates a transferrable path range determined according to the source IP address or the destination IP address. Accordingly, even when each of the communication devices (110a, 120a, 130a, 1110a, 1120a, 1140a) is an L3 switch which transfers the message by using the IP address, for example, the communication device is capable of appropriately determining the validity of the message by using the range information indicating the transferrable path range determined according to the IP address.

(7) For example, in the communication devices (140a, 140b, 1140a) described above, the range information indicates the transferrable path range determined according to the mobility state. With this, even when the transferrable path range varies according to a change in mobility state, the communication devices (140a, 140b, 1140a) each are capable of appropriately determining the validity of the message by using the range information which indicates the transferrable path range determined according to the mobility state.

(8) For example, in the communication devices (140a, 140b, 1140a) described above, the mobility state is a state related to whether or not the mobility is moving or stopped. Accordingly, even when the transferrable path range in the state where the mobility is moving is different from the transferrable path range in the state where the mobility is stopped, the communication devices (140a, 140b, 1140a) each are capable of appropriately determining the validity of the message by using the range information which indicates the transferrable path range determined according to each state.

(9) For example, in the communication devices (100a, 100b, 110a, 130a, 140a, 140b, 1110a, 1140a) described above, the range information indicates, as the transferable path range, a fixed range statically predetermined. Accordingly, the communication devices (100a, 100b, 110a, 130a, 140a, 140b, 1110a, 1140a) each are capable of appropriately determining the validity of the message by using the range information statically determined, under the static environment, for example.

(10) For example, the communication devices (120a, 1120a) described above further include updating units (127, 1127). The updating units (127, 1127) dynamically update the range information according to the updates of the electronic control devices.

With this, the communication devices (120a, 1120a) each are capable of updating the range information according to a physical change and the like corresponding to the addition or deletion of an electronic control device, and are capable of appropriately determining the validity of the message by using the updated range information. In other words, the communication devices (120a, 1120a) each are capable of appropriately determining the validity of the message by using the range information determined more flexibly.

(11) For example, in the communication devices (120a, 1120a) described above, the updating units (127, 1127) dynamically update the range information according to the update of the attribute information of the electronic control devices.

Accordingly, even under the environment where attribute information corresponding to the IP address of an electronic control device, for example, is changed dynamically, the communication devices (120a, 1120a) each are capable of appropriately determining the validity of the message by using the range information dynamically determined.

(12) For example, in the communication devices (120a, 1120a) described above, the attribute information is updated by using SOME/IP (Scalable service-Oriented MiddlewarE over IP) protocol.

With this, even under the environment where the attribute information of an electronic control device is dynamically changed by update or the like of a firmware based on SOME/IP, the communication devices (120a, 1120a) each are capable of appropriately determining the validity of the message by using the range information dynamically determined.

(13) For example, the communication devices (100a, 100b, 110a, 120a, 130a, 140a, 140b, 1110a, 1120a, 1140a) further include processing units (102, 106, 132). The processing units (102, 106, 132) each perform a predetermined action based on the determination result of the validity of the received message.

Accordingly, the communication devices (100a, 100b, 110a, 120a, 130a, 140a, 140b, 1110a, 1120a, 1140a) each are capable of performing appropriate processing based on the determination result, leading to an increased safety of the overall system of the mobility network.

(14) For example, in the communication devices (100a, 100b, 110a, 120a, 140a, 140b, 1110a, 1120a, 1140a) described above, the processing unit (102) controls whether or not the received message can be transferred, based on the determination result.

Accordingly, the communication devices (100a, 100b, 110a, 120a, 140a, 140b, 1110a, 1120a, 1140a) each are capable of appropriately controlling whether or not the message can be transferred, leading to an increased safety of the overall system of the mobility network.

(15) For example, in the communication devices (100a, 100b, 110a, 120a, 130a, 140a, 140b, 1110a, 1120a, 1140a), the processing units (102, 106, 132) record the determination results.

With this, the communication devices (100a, 100b, 110a, 120a, 130a, 140a, 140b, 1110a, 1120a, 1140a) allow the determination results to be analyzed later. Accordingly, the communication devices (100a, 100b, 110a, 120a, 130a, 140a, 140b, 1110a, 1120a, 1140a) each allow the transferable path range indicated by the range information to be updated appropriately.

(16) For example, in the communication devices (100a, 100b, 110a, 120a, 130a, 140a, 140b, 1110a, 1120a, 1140a), the processing units (102, 106, 132) each notify the transmission source of the received message of the determination result. Accordingly, the communication devices (100a, 100b, 110a, 120a, 130a, 140a, 140b, 1110a, 1120a, 1140a) each are capable of directing the transmission source to transmit an appropriate message.

(17) For example, the communication device (130a) further includes the processing unit (132). When the received message is determined not to be valid, the processing unit (132) updates the received message by updating the TTL value included in the received message with a value within the TTL range indicated by the range information, and transfers the updated message. Accordingly, under the environment where the transmission source is unlikely to set an appropriate TTL value to a message, the communication device (130a) is capable of setting an appropriate TTL value to the message.

(18) For example, the communication method according to one aspect of the present disclosure is a communication method in the mobility network. The mobility network is a network mounted in a mobility, and is a network used by a plurality of electronic control devices for communication.

The communication method includes the receiving step (S1001), and the determining steps (S1005, S1105, S1405, S1505, S2005, S2405). In the receiving step (S1001), a message on the mobility network is received.

In the determining steps (S1005, S1105, S1405, S1505, S2005, S2405), the validity of the received message is determined by using the range information which indicates the transferrable path range determined for the message on the mobility network.

With this, the situation where messages on the mobility network are transferred while exceeding the assumed range can be suppressed. Accordingly, data leakage can be prevented.

(19) For example, the communication systems (10, 40) according to one aspect of the present disclosure are the communication systems (10, 40) in the mobility network. The mobility network is a network mounted in a mobility, and is a network used by a plurality of electronic control devices for communication. The communication systems (10, 40) include holding units (105, 115, 125, 145, 1115, 1125, 1145), receiving units (101, 121, 1111, 1121), and determining units (104, 114, 134, 144, 1114, 1144).

The holding units (105, 115, 125, 145, 1115, 1125, 1145) each hold range information which indicates the transferable path range determined for the message on the mobility network. The receiving units (101, 121, 1111, 1121) receive messages on the mobility network. The determining units (104, 114, 134, 144, 1114, 1144) each determine the validity of the received message by using the range information.

Accordingly, the communication systems (10, 40) are each capable of suppressing the situation where messages on the mobility network are transferred while exceeding the assumed range, and are capable of preventing data leakage.

(20) For example, the communication devices (100a, 100b, 110a, 120a, 130a, 140a, 140b, 1110a, 1120a, 1140a) described above correspond to the Ethernet switches 100a, 100b, 110a, 120a, 130a, 140a, 140b, 1110a, 1120a, and 1140a, for example. The communication systems (10, 40) described above correspond to, for example, in-vehicle network systems 10 and 40.

The holding units (105, 115, 125, 145, 1115, 1125, 1145) correspond to, for example, the whitelist holding units (105, 115, 125, 145, 1115, 1125, 1145). The receiving units (101, 121, 1111, 1121) described above correspond to, for example, the communication units 101, 121, 1111, and 1121. The determining units (104, 114, 134, 144, 1114, 1144) described above correspond, for example, to the whitelist determining units 104, 114, 134, 144, 1114, and 1144. The updating units (127, 1127) described above correspond to, for example, the whitelist generating units 127 and 1127. The processing units (102, 106, 132) described above correspond to, for example, the retransfer processing units 102 and 132, and the error message transmitting unit 106.

The herein disclosed subject matter is to be considered descriptive and illustrative only, and the appended claims are of a scope intended to cover and encompass not only the particular embodiments disclosed, but also equivalent structures, methods, and/or uses.

INDUSTRIAL APPLICABILITY

The communication device and the like according to one or more exemplary embodiments disclosed herein are usable as, for example, a communication device which determines the validity of a message on the mobility network, and are applicable to various systems which use mobility networks.

The invention claimed is:

1. A communication device connected to a mobility network which is a network mounted in a mobility entity, the mobility network being a network used by a plurality of electronic control devices for communication, the communication device comprising:
   a storage that holds range information indicating a transferrable path range determined for a message on the mobility network;
   a receiver that receives the message on the mobility network;
   a determinator that determines a validity of the message received, by using the range information; and
   a processor,
   wherein the range information indicates a range of a time to live (TTL) as the transferable path range,
   the determinator determines the validity of the message received by comparing a value of the TTL included in the message received with the range of the TTL indicated by the range information, and
   when the message received is determined not to be valid, the processor updates the message received by updating the value of the TTL included in the message received with a value within the range of the TTL indicated by the range information and transfers the message updated.

2. The communication device according to claim 1, wherein the range information indicates the transferrable path range determined according to one of a transmission source and a transmission destination.

3. The communication device according to claim 2, wherein the range information indicates the transferrable path range determined according to one of a media access control (MAC) address of the transmission source and a MAC address of the transmission destination.

4. The communication device according to claim 2, wherein the range information indicates the transferrable path range determined according to one of an internet protocol (IP) address of the transmission source and an IP address of the transmission destination.

5. The communication device according to claim 1, wherein the range information indicates the transferrable path range determined according to a state of the mobility entity.

6. The communication device according to claim 5, wherein the state of the mobility entity is related to one of a state where the mobility entity is moving and a state where the mobility entity is stopped.

7. The communication device according to claim 1, wherein the range information indicates a fixed range statically predetermined, as the transferrable path range.

8. The communication device according to claim 1, further comprising
   an updater that dynamically updates the range information according to an update of the plurality of electronic control devices.

9. The communication device according to claim 8, wherein the updater dynamically updates the range information according to an update of attribute information of the plurality of electronic control devices.

10. The communication device according to claim 9, wherein the attribute information is updated using a Scalable service-Oriented MiddlewarE over IP (SOME/IP) protocol.

11. The communication device according to claim 1, wherein the processor executes a predetermined action, based on a determination result of the validity of the message received.

12. The communication device according to claim 11, wherein the processor controls whether or not the message received can be transferred, based on the determination result.

13. The communication device according to claim 11, wherein the processor records the determination result.

14. The communication device according to claim 11, wherein the processor notifies a transmission source of the message received of the determination result.

15. A communication method performed in a mobility network which is a network mounted in a mobility entity, the mobility network being a network used by a plurality of electronic control devices for communication, the communication method comprising:
   receiving a message on the mobility network; and
   determining a validity of the message received, by using range information indicating a transferrable path range determined for the message on the mobility network,
   wherein the range information indicates a range of a time to live (TTL) as the transferable path range,
   in the determining, the validity of the message received is determined by comparing a value of the TTL included in the message received with the range of the TTL indicated by the range information, and
   when the message received is determined not to be valid, the message received is updated by updating the value of the TTL included in the message received with a value within the range of the TTL indicated by the range information and the message updated is transferred.

16. A communication system in a mobility network which is a network mounted in a mobility entity, the mobility network being a network used by a plurality of electronic control devices for communication, the communication system comprising:
   a storage that holds range information indicating a transferrable path range determined for a message on the mobility network;
   a receiver that receives the message on the mobility network;
   a determinator that determines a validity of the message received, by using the range information; and
   a processor,
   wherein the range information indicates a range of a time to live (TTL) as the transferable path range,
   the determinator determines the validity of the message received by comparing a value of the TTL included in the message received with the range of the TTL indicated by the range information, and when the message received is determined not to be valid, the processor updates the message received by updating the value of the TTL included in the message received with a value within the range of the TTL indicated by the range information and transfers the message updated.

* * * * *